(12) United States Patent
Suzuki

(10) Patent No.: US 12,441,157 B2
(45) Date of Patent: Oct. 14, 2025

(54) THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 18/589,732

(22) Filed: Feb. 28, 2024

(65) Prior Publication Data
US 2024/0300285 A1 Sep. 12, 2024

(30) Foreign Application Priority Data

Mar. 9, 2023 (JP) .................................. 2023-036606

(51) Int. Cl.
| | | |
|---|---|---|
| *B60H 1/00* | (2006.01) | |
| *B60K 11/02* | (2006.01) | |
| *B60L 50/60* | (2019.01) | |
| *B60L 58/27* | (2019.01) | |

(52) U.S. Cl.
CPC ..... *B60H 1/00278* (2013.01); *B60H 1/00385* (2013.01); *B60H 1/00885* (2013.01); *B60K 11/02* (2013.01); *B60L 50/60* (2019.02); *B60L 58/27* (2019.02); *B60H 2001/00307* (2013.01)

(58) Field of Classification Search
CPC . B60H 1/00278; B60H 1/00385; B60L 50/60; H01M 2010/4271; H01M 2220/20; Y02E 60/10
See application file for complete search history.

(56) References Cited

U.S. PATENT DOCUMENTS

| | | | | |
|---|---|---|---|---|
| 9,643,469 B2* | 5/2017 | Kakehashi | .......... | H01M 10/625 |
| 2015/0258875 A1* | 9/2015 | Enomoto | .............. | B60K 11/02 |
| | | | | 165/104.31 |
| 2016/0031288 A1* | 2/2016 | Nishikawa | ............. | B60L 58/26 |
| | | | | 165/43 |
| 2016/0153343 A1* | 6/2016 | Kakehashi | ............ | B60K 11/02 |
| | | | | 123/41.31 |
| 2017/0297414 A1* | 10/2017 | Beloe | ................. | B60H 1/00885 |
| 2019/0118610 A1 | 4/2019 | Johnston et al. | | |
| 2020/0353790 A1 | 11/2020 | Miyoshi | | |
| 2021/0296964 A1* | 9/2021 | Sakamoto | .......... | H05K 7/20872 |
| 2021/0300154 A1 | 9/2021 | Hasegawa et al. | | |

(Continued)

FOREIGN PATENT DOCUMENTS

| | | |
|---|---|---|
| CN | 112277559 B | 7/2022 |
| CN | 115179717 A | 10/2022 |

(Continued)

*Primary Examiner* — Lionel Nouketcha
(74) *Attorney, Agent, or Firm* — Oliff PLC

(57) ABSTRACT

A thermal management system includes: an electrical storage device configured to exchange heat with a first flow path; a drive device configured to exchange heat with a second flow path; a radiator provided on a third flow path; a chiller device provided on a fourth flow path; and a switching device. In the thermal management system, during heating control for the electrical storage device, the switching device are controlled so that a connection flow path connecting the first flow path and the fourth flow path is formed and that the connection flow path, the second flow path, and the third flow path are disconnected from and independent of each other.

9 Claims, 19 Drawing Sheets

(56) References Cited

U.S. PATENT DOCUMENTS

2022/0402331 A1  12/2022  Tada et al.
2023/0021779 A1* 1/2023  Schoeneman ......... B60L 53/302
2023/0034110 A1   2/2023  Huang et al.

FOREIGN PATENT DOCUMENTS

JP      2010-272395 A   12/2010
WO      2015/122137 A1   8/2015

* cited by examiner

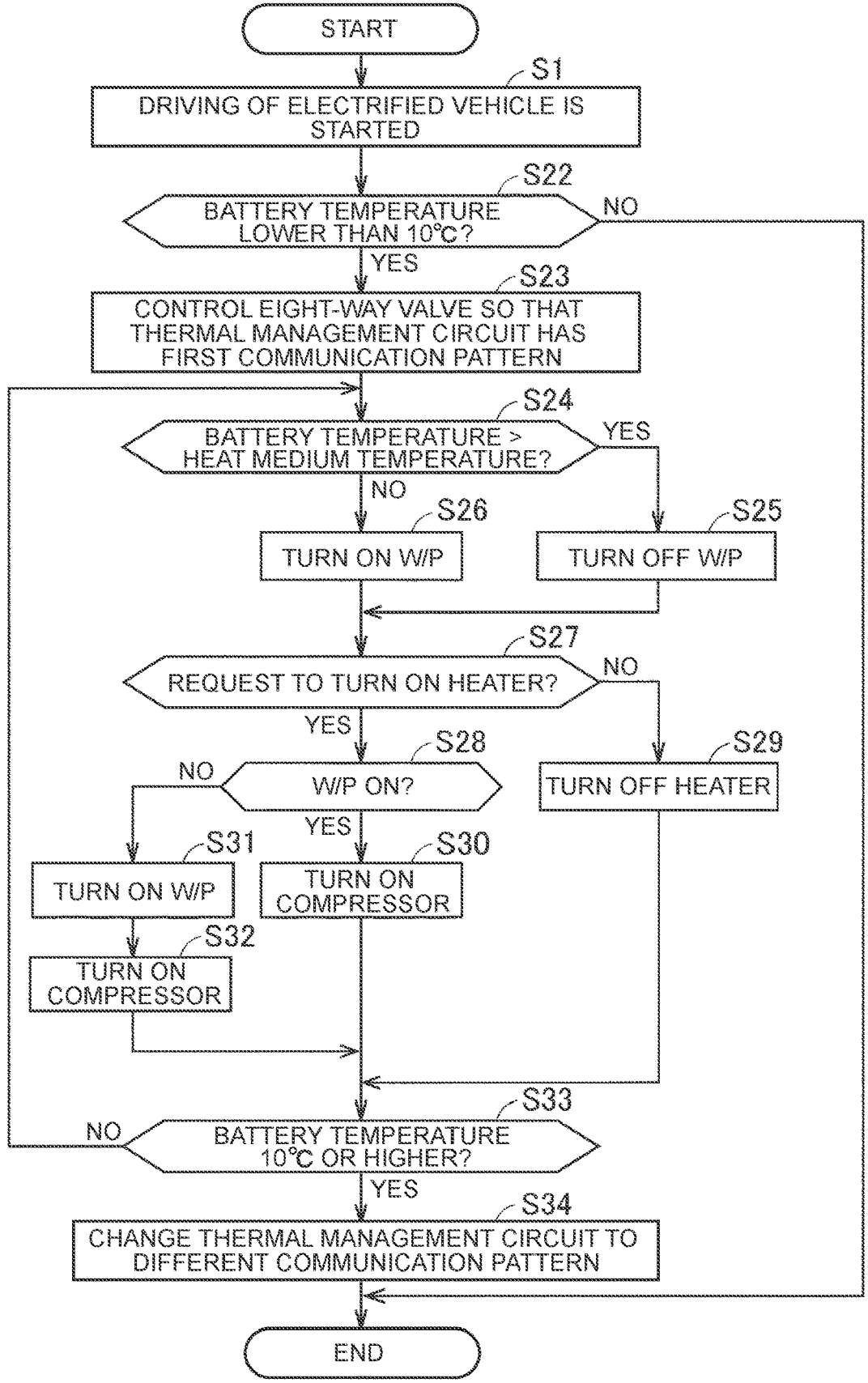

THERMAL MANAGEMENT SYSTEM

CROSS-REFERENCE TO RELATED APPLICATION

This application claims priority to Japanese Patent Application No. 2023-036606 filed on Mar. 9, 2023, incorporated herein by reference in its entirety.

BACKGROUND

1. Technical Field

The present disclosure relates to thermal management systems.

2. Description of Related Art

Japanese Unexamined Patent Application Publication No. 2010-272395 (JP 2010-272395 A) discloses an electrified vehicle. The electrified vehicle includes an electrical storage device (battery), an inverter, a motor, and a control device. The electrical storage device is connected to the inverter. The inverter is connected to the motor. The control device controls the current of the electrical storage device by controlling switching of the inverter. The control device thus controls heat that is generated due to power loss in the internal resistance of the electrical storage device. As a result, the control device can perform heating control for increasing the temperature of the electrical storage device using the current of the electrical storage device (self-heating of the electrical storage device).

SUMMARY

In electrical apparatuses such as electrified vehicles, it is sometimes important to effectively use heat from a drive device including an inverter and a motor. Efficient self-heating of an electrical storage device is also desired. That is, it is desired to allow efficient self-heating of the electrical storage device while effectively using heat generated by the drive device.

The present disclosure provides a thermal management system that allows efficient self-heating of an electrical storage device while effectively using heat generated by a drive device.

A thermal management system according to one aspect of the present disclosure is a thermal management system mounted on an electrical apparatus. The thermal management system includes: a first flow path, a second flow path, a third flow path, and a fourth flow path, each configured to allow a heat medium to flow through; an electrical storage device configured to exchange heat with the heat medium in the first flow path; a drive device configured to exchange heat with the heat medium in the second flow path and to supply a driving force to the electrical apparatus; a radiator provided on the third flow path; a chiller device provided on the fourth flow path; and a switching device configured to switch a connection state among the first flow path, the second flow path, the third flow path, and the fourth flow path. The switching device is configured to cause a heating circuit formed when heating the electrical storage device by causing a current to flow through the electrical storage device. The heating circuit is a flow path circuit in which a connection flow path connecting the first flow path and the fourth flow path is formed and the connection flow path, the second flow path, and the third flow path are disconnected from and independent of each other.

In the thermal management system according to the above aspect of the present disclosure, as described above, the connection flow path connecting the first flow path and the second flow path is formed and the connection flow path, the second flow path, and the third flow path are disconnected from and independent of each other when heating the electrical storage device. Therefore, heat from self-heating of the electrical storage device is less likely to escape to the drive device in the second flow path and the radiator in the third flow path. Moreover, heat generated by the drive device is less likely to escape to the electrical storage device in the first flow path and the radiator in the third flow path. It is therefore possible to allow efficient self-heating of the electrical storage device while effectively using the heat generated by the drive device.

In the thermal management system according to the above aspect, the electrical apparatus may be an electrified vehicle. The electrical storage device may be heated when a traction system of the electrified vehicle is activated. With this configuration, the temperature of the electrical storage device can be easily increased when the electrified vehicle starts to travel. As a result, the traveling performance of the electrified vehicle can be easily increased to a certain level or higher when the electrified vehicle starts to travel.

In the thermal management system according to the above aspect, the electrical storage device may be configured to be externally chargeable with charging power supplied from charging equipment external to the electrical apparatus. At start of being externally charged, the electrical storage device may be heated to increase a temperature of the electrical storage device to a predetermined temperature or higher. With this configuration, the temperature of the electrical storage device can be easily increased at the start of the external charging. As a result, the charging rate and charging efficiency can be easily increased to a certain level or higher at the start of the external charging. As used herein, "at the start of charging" refers to when the charging power begins to be supplied to the electrical storage device.

The thermal management system according to the above aspect may further include: a first temperature sensor configured to measure the temperature of the electrical storage device; a second temperature sensor configured to measure a temperature of the heat medium in the first flow path; and a pump configured to circulate the heat medium in the connection flow path. The pump may be stopped when a measured value from the first temperature sensor is higher than a measured value from the second temperature sensor during heating with the heating circuit formed. The pump may be driven when the measured value from the first temperature sensor is equal to or less than the measured value from the second temperature sensor during the heating with the heating circuit formed. With this configuration, when the measured value from the first temperature sensor is higher than the measured value from the second temperature sensor, the pump is stopped, so that the heat medium in the first flow path does not flow. Accordingly, heat of the electrical storage device is less likely to transfer to the heat medium in the first flow path. When the measured value from the first temperature sensor is equal to or less than the measured value from the second temperature sensor, the pump is driven, so that the heat medium in the first flow path flows. Accordingly, heat of the heat medium in the first flow path can be transferred to the electrical storage device.

In the thermal management system according to the above aspect, the electrical apparatus may be an electrified vehicle.

The chiller device may be configured to exchange heat with an air conditioning circuit configured to adjust a cabin temperature of the electrified vehicle. When a heating request using the air conditioning circuit is made during the heating with the heating circuit formed, heat generated by the electrical storage device may be supplied to the air conditioning circuit via the chiller device. With this configuration, heat from self-heating of the electrical storage device can be easily used in the air conditioning circuit.

The thermal management system according to the above aspect may further include a control device. The control device may be configured to, when heating the electrical storage device by causing a current to flow through the electrical storage device, control the switching device to cause the heating circuit formed.

In the thermal management system according to the above aspect, the switching device may include a first five-way valve configured to connect or disconnect the first flow path, the second flow path, the third flow path, and the fourth flow path to or from each other, and a second five-way valve configured to connect or disconnect the first flow path, the second flow path, the third flow path, and the fourth flow path to or from each other.

In the thermal management system according to the above aspect, the switching device may include an eight-way valve configured to connect or disconnect the first flow path, the second flow path, the third flow path, and the fourth flow path to or from each other.

In the thermal management system according to the above aspect, the switching device may include a first six-way valve configured to connect or disconnect the first flow path, the second flow path, the third flow path, and the fourth flow path to or from each other, and a second six-way valve configured to connect or disconnect the first flow path, the second flow path, the third flow path, and the fourth flow path to or from each other.

According to the present disclosure, it is possible to allow efficient self-heating of the electrical storage device while effectively using heat generated by the drive device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart showing a control that is performed by the thermal management system according to the second embodiment;

DETAILED DESCRIPTION OF EMBODIMENTS

A first embodiment of the present disclosure will be described in detail below with reference to the drawings. The same or corresponding parts are denoted by the same signs throughout the drawings, and description thereof will not be repeated.

Figure 1:
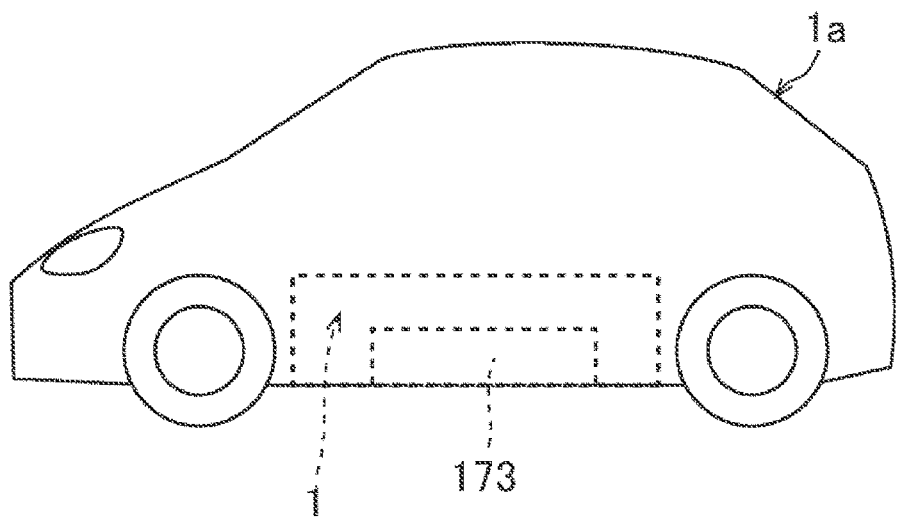
FIG. 1 shows an electrified vehicle on which a thermal management system according to a first embodiment is mounted.

Hereinafter, a configuration in which a thermal management system according to the present disclosure is mounted on an electrified vehicle 1*a* (see FIG. 1) will be described as an example. The electrified vehicle 1*a* is preferably a vehicle equipped with a traction battery 173, and is, for example, a battery electric vehicle (BEV). The electrified vehicle 1*a* may be a hybrid electric vehicle (HEV), a plug-in hybrid electric vehicle (PHEV), or a fuel cell electric vehicle (FCEV). However, the thermal management system according to the present disclosure is not limited to vehicle applications. The electrified vehicle 1*a* is an example of the "electrical apparatus" of the present disclosure.

First Embodiment

Overall Configuration

Figure 2:
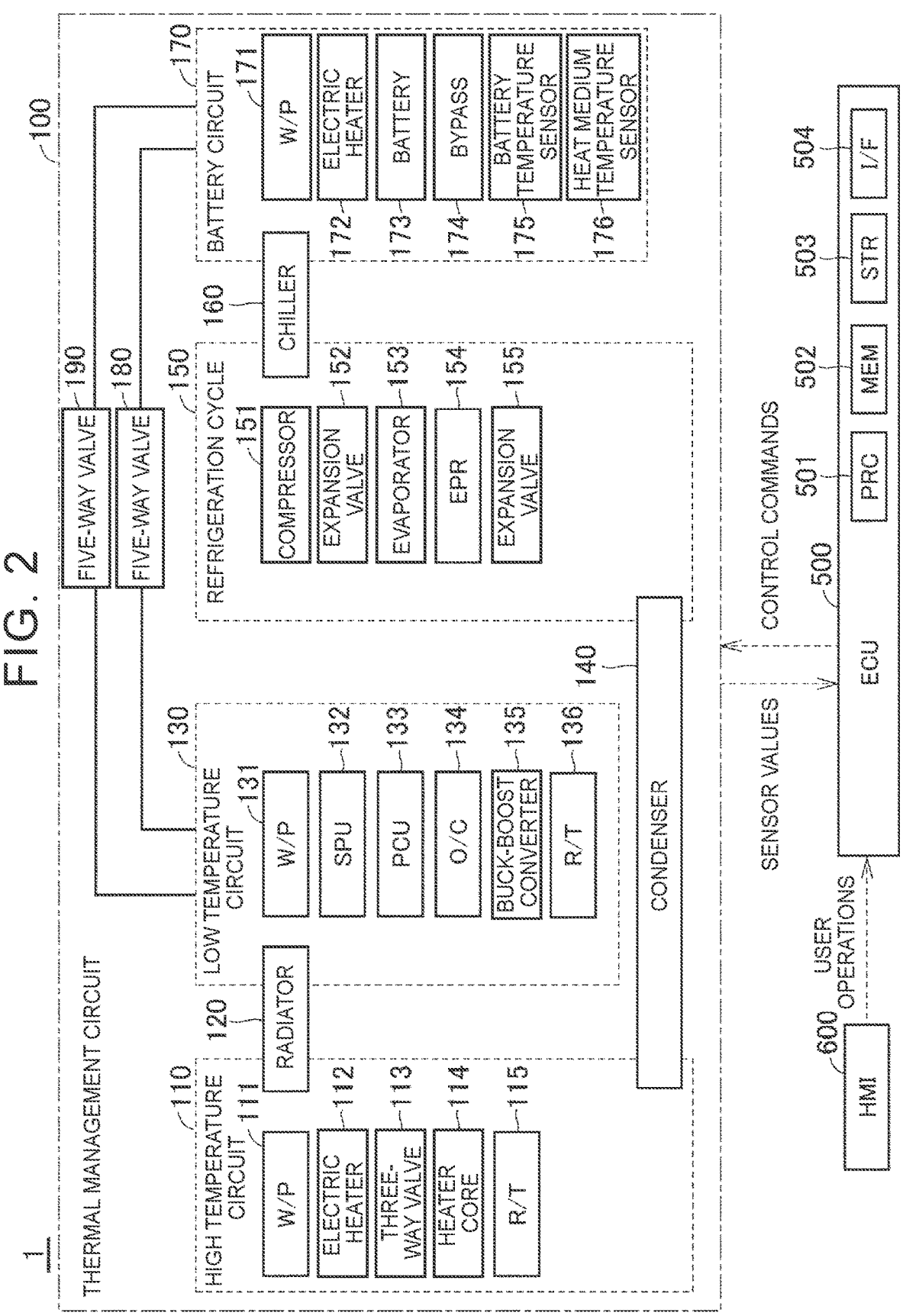
FIG. 2 shows the configuration of the thermal management system according to the first embodiment.

FIG. 2 shows an example of the overall configuration of a thermal management system 1 according to the first embodiment of the present disclosure. The thermal management system 1 includes a thermal management circuit 100, an electronic control unit (ECU) 500, and a human machine interface (HMI) 600.

The thermal management circuit 100 is configured to allow a heat medium to flow therethrough. The thermal management circuit 100 includes, for example, a high temperature circuit 110, a radiator 120, a low temperature circuit 130, a condenser 140, a refrigeration cycle 150, a chiller 160, a battery circuit 170, a five-way valve 180, and a five-way valve 190. Each of the five-way valves 180, 190 is an example of the "switching device" of the present disclosure. The chiller 160 is an example of the "chiller device" of the present disclosure.

The high temperature circuit 110 includes, for example, a water pump (W/P) 111, an electric heater 112, a three-way valve 113, a heater core 114, and a reservoir tank (R/T) 115. The heater core 114 is an example of the "air conditioning circuit" of the present disclosure.

The radiator 120 is connected to (i.e., shared by) both the high temperature circuit 110 and the low temperature circuit 130. The radiator 120 includes a high temperature (HT) radiator 121 and a low temperature (LT) radiator 122 (see FIG. 3). The low temperature radiator 122 exchanges heat between the heat medium flowing in the low temperature circuit 130 and outside air. The low temperature radiator 122 is an example of the "radiator" of the present disclosure.

The low temperature circuit 130 includes, for example, a water pump 131, a smart power unit (SPU) 132, a power control unit (PCU) 133, an oil cooler (O/C) 134, a buck-boost converter 135, and a reservoir tank 136. The PCU 133 and the oil cooler 134 are examples of the "drive device" of the present disclosure.

The condenser 140 is connected to both the high temperature circuit 110 and the refrigeration cycle 150.

The refrigeration cycle 150 includes, for example, a compressor 151, an expansion valve 152, an evaporator 153, an evaporative pressure regulator (EPR) 154, and an expansion valve 155.

The chiller 160 is connected to both the refrigeration cycle 150 and the battery circuit 170. The chiller 160 exchanges heat between the heat medium flowing in the battery circuit 170 and the heat medium circulating in the refrigeration cycle 150.

The battery circuit 170 includes, for example, a water pump 171, an electric heater 172, a battery 173, a bypass path 174, a battery temperature sensor 175, and a heat medium temperature sensor 176. The water pump 171 and the battery 173 are examples of the "pump" and the "electrical storage device" of the present disclosure, respectively. The battery temperature sensor 175 and the heat medium temperature sensor 176 are examples of the "first temperature sensor" and the "second temperature sensor" of the present disclosure, respectively.

Each of the five-way valves 180, 190 is connected to the low temperature circuit 130 and the battery circuit 170. The configuration of the thermal management circuit 100 will be described in detail with reference to FIG. 3.

The ECU 500 controls the thermal management circuit 100. The ECU 500 includes a processor 501, a memory 502, a storage 503, and an interface 504.

The processor 501 is, for example, a central processing unit (CPU) or a micro-processing unit (MPU). The memory 502 is, for example, a random access memory (RAM). The storage 503 is a rewritable nonvolatile memory such as a hard disk drive (HDD), a solid state drive (SSD), or a flash memory. The storage 503 stores system programs including an operating system (OS), and control programs including computer-readable codes that are necessary for control calculations. The processor 501 implements various processes by reading the system programs and the control programs, loading them into the memory 502, and executing them. The interface 504 controls communication between the ECU 500 and components of the thermal management circuit 100.

The ECU 500 generates control commands based on sensor values acquired from various sensor (e.g., battery temperature sensor 175 and heat medium temperature sensor 176) included in the thermal management circuit 100, user operations received by the HMI 600, etc., and outputs the generated control commands to the thermal management circuit 100. The ECU 500 may be divided into a plurality of ECUs, one for each function. Although FIG. 2 illustrates an example in which the ECU 500 includes one processor 501, the ECU 500 may include a plurality of processors. The same applies to the memory 502 and the storage 503.

As used herein, the "processor" is not limited to a processor in a narrow sense that performs processes by a stored program method, and may include hardwired circuitry such as an application-specific integrated circuit (ASIC) and a field-programmable gate array (FPGA). Therefore, the term "processor" may be read as processing circuitry that performs processes defined in advance by computer-readable codes and/or hardwired circuitry.

The HMI 600 is a display with a touch panel, an operation panel, a console, etc. The HMI 600 receives user operations for controlling the thermal management system 1. The HMI 600 outputs signals indicating user operations to the ECU 500.

Configuration of Thermal Management Circuit

Figure 3:
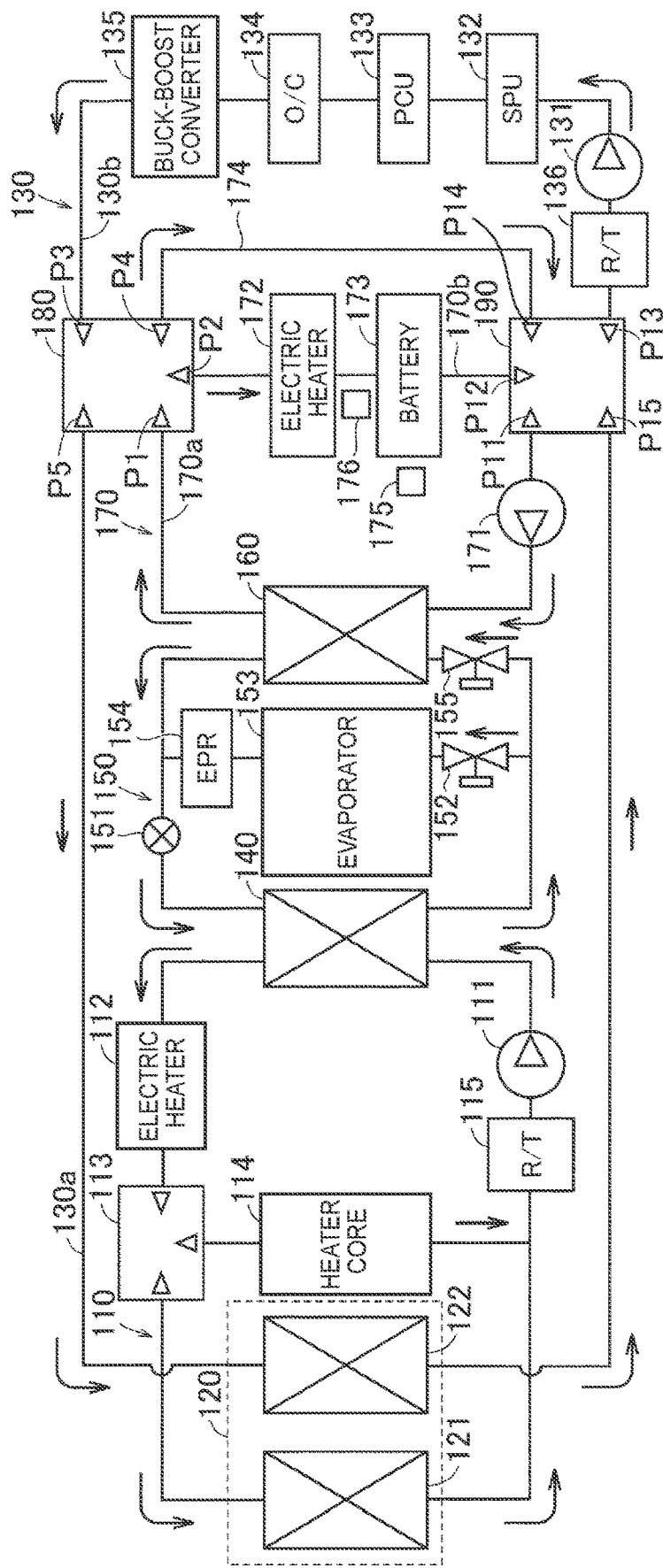
FIG. 3 shows the detailed configuration of the thermal management system according to the first embodiment.

FIG. 3 shows an example of the configuration of the thermal management circuit 100 according to the first embodiment. A heat medium (usually hot water) circulating in the high temperature circuit 110 flows through either or both of a first path and a second path. The first path is a path of "water pump 111-condenser 140-electric heater 112-three-way valve 113-heater core 114-reservoir tank 115-water pump 111." The second path is a path of "water pump 111-condenser 140-electric heater 112-three-way valve 113-high temperature radiator 121-reservoir tank 115-water pump 111."

The heat medium (coolant) circulating in the low temperature circuit 130 flows through a path of "water pump 131-SPU 132-PCU 133-oil cooler 134-buck-boost converter 135-five-way valve 180-low temperature radiator 122-five-way valve 190-reservoir tank 136-water pump 131."

The water pump 131 circulates the heat medium in the low temperature circuit 130 according to a control command from the ECU 500. The SPU 132 controls charge and discharge of the battery 173 according to a control command from the ECU 500. The PCU 133 converts direct current (DC) power supplied from the battery 173 to alternating current (AC) power to supply the AC power to a motor (not shown) contained in a transaxle according to a control command from the ECU 500. The oil cooler 134 circulates lubricating oil for the motor by using an electrical oil pump (EOP) (not shown). The oil cooler 134 cools the transaxle through heat exchange between the heat medium circulating in the low temperature circuit 130 and the lubricating oil for the motor. The SPU 132, the PCU 133, the oil cooler 134, and the buck-boost converter 135 are cooled by the heat medium circulating in the low temperature circuit 130. The reservoir tank 136 stores part of the heat medium flowing in the low temperature circuit 130 to maintain the pressure and amount of heat medium in the low temperature circuit 130. Each of the five-way valves 180, 190 switches the path of the heat medium in the low temperature circuit 130 and the battery circuit 170 according to a control command from the ECU 500. The low temperature radiator 122 is disposed near the high temperature radiator 121, and exchanges heat with the high temperature radiator 121. Instead of the oil cooler 134, the transaxle may be provided in the low temperature circuit 130.

The heat medium (gas-phase refrigerant or liquid-phase refrigerant) circulating in the refrigeration cycle 150 flows through either or both of a first path and a second path. The first path is a path of "compressor 151-condenser 140-expansion valve 152-evaporator 153-EPR 154-compressor 151." The second path is a path of "compressor 151-condenser 140-expansion valve 155-chiller 160-compressor 151."

The heat medium (coolant) circulating in the battery circuit 170 flows through either or both of a first path and a second path. The first path is a path of "water pump 171-chiller 160-five-way valve 180-electric heater 172-battery 173-five-way valve 190-water pump 171." The second path is a path of "water pump 171-chiller 160-five-way valve 180-bypass path 174-five-way valve 190-water pump 171.

The water pump 171 circulates the heat medium in the battery circuit 170 according to a control command from the ECU 500. The chiller 160 cools the heat medium circulating in the battery circuit 170 through heat exchange between the heat medium circulating in the refrigeration cycle 150 and the heat medium circulating in the battery circuit 170. The electric heater 172 heats the heat medium according to a control command from the ECU 500. The battery 173 supplies traction power to the motor contained in the transaxle. The battery 173 may be heated with the electric heater 172 or may be cooled with the chiller 160. The bypass path 174 is provided to allow the heat medium to bypass the electric heater 172 and the battery 173. When the heat medium flows through the bypass path 174, a change in temperature of the heat medium due to heat absorption and heat dissipation between the heat medium and the battery 173 can be reduced. The battery temperature sensor 175 detects the temperature of the battery 173. The heat medium temperature sensor 176 detects the temperature of the heat medium flowing in the battery circuit 170.

The five-way valve 180 is provided with five ports P1 to P5. The port P1 is an inlet port into which the heat medium flows from the chiller 160. The port P2 is an outlet port through which the heat medium flows toward the electric heater 172 and the battery 173 of the battery circuit 170. The port P3 is an inlet port into which the heat medium flows from the SPU 132, the PCU 133, the oil cooler 134, and the buck-boost converter 135 of the low temperature circuit 130. The port P4 is an outlet port from which the heat medium flows toward the bypass path 174 of the battery circuit 170. The port P5 is an outlet port from which the heat medium flows toward the low temperature radiator 122.

The five-way valve 190 is provided with five ports P11 to P15. The port P11 is an outlet port from which the heat medium flows toward the chiller 160. The port P12 is an inlet port into which the heat medium flows from the electric heater 172 and the battery 173 of the battery circuit 170. The port P13 is an outlet port from which the heat medium flows toward the SPU 132, the PCU 133, the oil cooler 134, and the buck-boost converter 135 of the low temperature circuit 130. The port P14 is an inlet port into which the heat medium flows from the bypass path 174 of the battery circuit 170. The port P15 is an inlet port into which the heat medium flows from the low temperature radiator 122.

Figure 4:
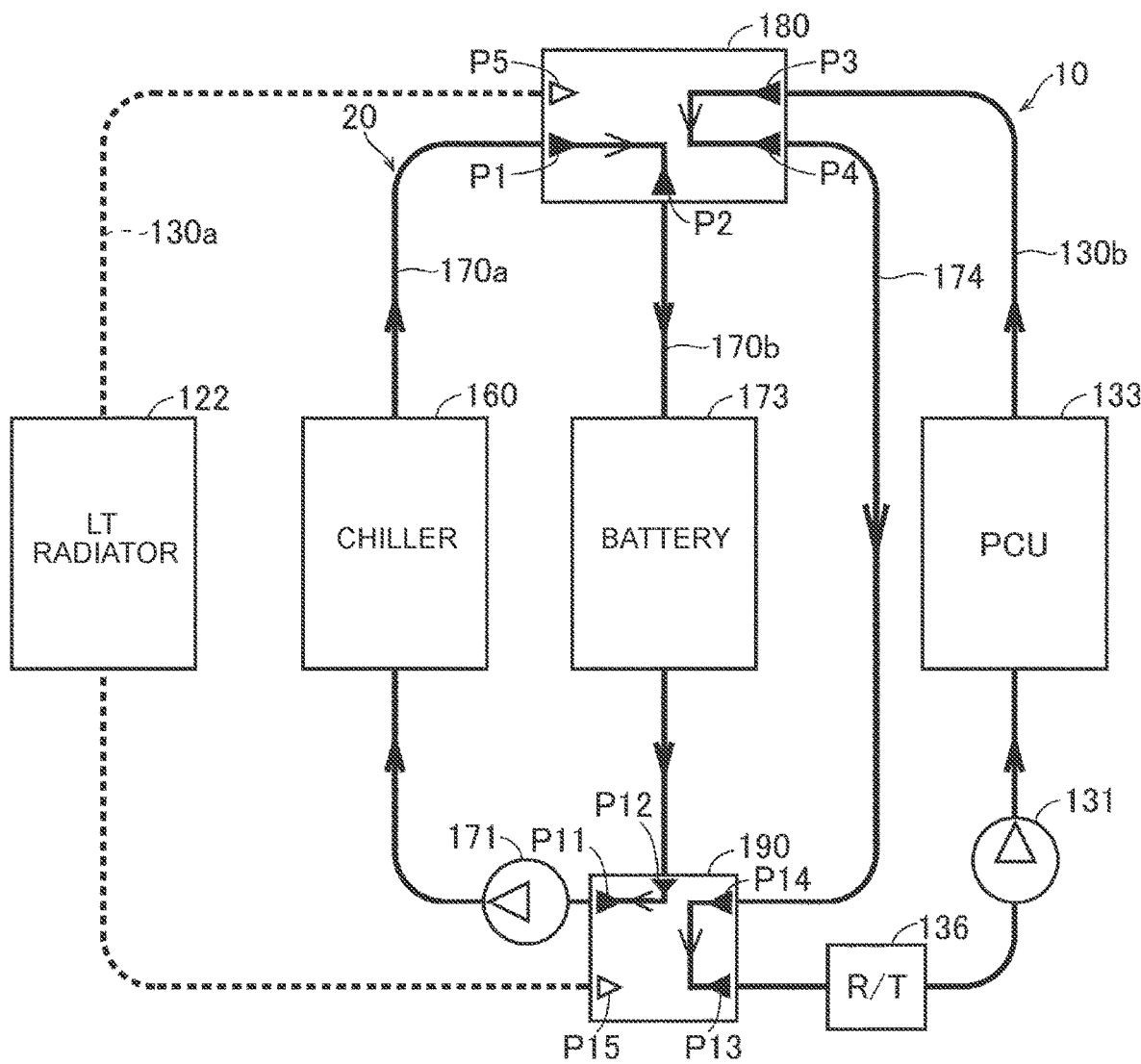
FIG. 4 shows the state of a thermal management circuit when heating a battery according to the first embodiment.

As shown in FIG. 4, the battery 173 is provided in a flow path 170b of the battery circuit 170. The battery 173 exchanges heat with the heat medium in the flow path 170b. The flow path 170b is in thermal contact with the battery 173. The flow path 170b is a flow path connecting the port P2 of the five-way valve 180 and the port P12 of the five-way valve 190. The flow path 170b is an example of the "first flow path" of the present disclosure.

The low temperature radiator 122 is provided in a flow path 130a of the low temperature circuit 130. The flow path 130a is a flow path connecting the port P5 of the five-way valve 180 and the port P15 of the five-way valve 190. The flow path 130a is an example of the "third flow path" of the present disclosure.

The water pump 131, the SPU 132, the PCU 133, the oil cooler 134, the buck-boost converter 135, and the reservoir tank 136 are provided in the flow path 130b of the low temperature circuit 130. The PCU 133, the oil cooler 134, etc. exchange heat with the heat medium in the flow path 130b. The flow path 130b is in thermal contact with the SPU 132, the PCU 133, the oil cooler 134, and the buck-boost converter 135. The flow path 130b is a flow path connecting the port P3 of the five-way valve 180 and the port P13 of the five-way valve 190. The flow path 130b is an example of the "second flow path" of the present disclosure.

The chiller 160 is provided in a flow path 170a of the battery circuit 170. The flow path 170a is a flow path connecting the port P1 of the five-way valve 180 and the port P11 of the five-way valve 190. The flow path 170a is an example of the "fourth flow path" of the present disclosure.

Communication Patterns

FIG. 4 is a conceptual diagram showing an overview of a predetermined communication pattern (hereinafter sometimes referred to as "battery heating communication pattern") of the thermal management circuit 100 that is formed by controlling the five-way valve 180 and the five-way valve 190. The battery heating communication pattern is an example of the "heating circuit" of the present disclosure.

Some electrified vehicles are not equipped with an engine. Therefore, there are cases where it is not possible to use engine waste heat to heat a component in an electrified vehicle that is to be heated. Accordingly, it is sometimes important to effectively use heat from a drive device including an inverter and a motor. Efficient self-heating of an electrical storage device is also desired. That is, it is desired to allow efficient self-heating of the electrical storage device while effectively using heat generated by the drive device.

In the first embodiment, the ECU 500 causes the battery heating communication pattern shown in FIG. 4 formed when heating the battery 173. In the battery heating communication pattern, the five-way valve 180 forms a path communicating between the port P1 and the port P2 and a path communicating between the port P3 and the port P4.

In the battery heating communication pattern, the five-way valve 190 forms a path communicating between the port P11 and the port P12 and a path communicating between the port P13 and the port P14.

As a result, the bypass path 174 and the flow path 130b are connected to form a first closed circuit 10. The flow path 170a and the flow path 170b are also connected to form a second closed circuit 20. The second closed circuit 20 is an example of the "connection flow path" of the present disclosure.

The first closed circuit 10, the second closed circuit 20, and the flow path 130a are thus disconnected from and independent of each other. That is, the low temperature radiator 122 is independent without being connected to either the first closed circuit 10 or the second closed circuit 20.

When the battery 173 is used in the battery heating communication pattern shown in FIG. 4, heat from self-heating of the battery 173 is accumulated (stored) in the second closed circuit 20. In this case, the chiller 160 is basically not operated. However, the chiller 160 may be operated if there is a heat request for air conditioning.

The PCU 133 and the transaxle (not shown) also generate heat during self-heating of the battery 173. The heat generated by the PCU 133 and the transaxle is accumulated (stored) in the first closed circuit 10.

As a result, it is possible to allow efficient self-heating of the battery 173 while effectively using heat generated by the drive device such as the PCU 133.

Method for Controlling Thermal Management Circuit

Figure 5:
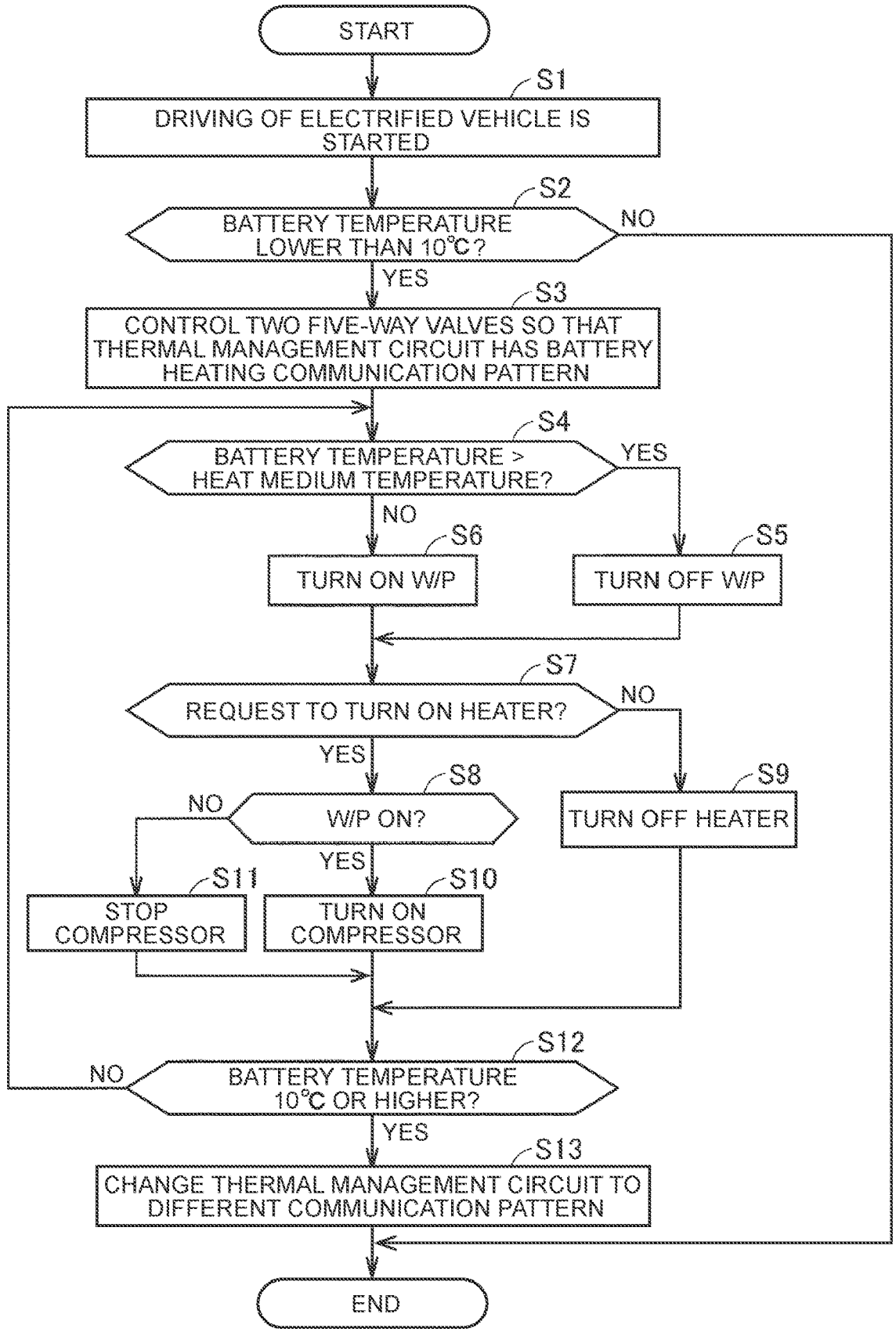
FIG. 5 is a flowchart showing a control that is performed by the thermal management system according to the first embodiment.

A method for controlling the thermal management system 1 will be described with reference to the flowchart of FIG. 5. The flow shown in FIG. 5 is merely illustrative, and the control in the present disclosure is not limited to the example shown in FIG. 5.

In step S1, driving of the electrified vehicle 1*a* is started (traction system is activated). Specifically, a start button, not shown, of the electrified vehicle 1*a* is pressed, so that the PCU 133 and the battery 173 are electrically connected (by a system main relay (SMR), not shown). By receiving a predetermined internal signal in the electrified vehicle 1*a*, the ECU 500 detects that driving of the electrified vehicle 1*a* has been started.

In step S2, the ECU 500 determines whether the temperature of the battery 173 detected by the battery temperature sensor 175 is lower than 10° C. When the temperature of the battery 173 is lower than 10° C. (Yes in S2), the process proceeds to step S3. When the temperature of the battery 173 is equal to or higher than 10° C. (No in S2), the process ends. The threshold in step S2 may be a value other than 10° C.

In step S3, the ECU 500 controls the five-way valve 180 and the five-way valve 190 so that the thermal management circuit 100 has the battery heating communication pattern shown in FIG. 4.

In step S4, the ECU 500 determines whether the temperature of the battery 173 detected by the battery temperature sensor 175 is higher than the temperature of the heat medium flowing in the battery circuit 170 detected by the heat medium temperature sensor 176. When the temperature of the battery 173 is higher than the temperature of the heat medium (Yes in S4), the process proceeds to step S5. When the temperature of the battery 173 is equal to or lower than the temperature of the heat medium (No in S4), the process proceeds to step S6.

In step S5, the ECU 500 turns off the water pump 171. When the water pump 171 is already off, the ECU 500 keeps the water pump 171 off. This reduces dissipation of heat generated by the battery 173 to the heat medium. The process then proceeds to step S7.

In step S6, the ECU 500 turns on the water pump 171. When the water pump 171 is already on, the ECU 500 keeps the water pump 171 on. This allows the heat of the heat medium in the battery circuit 170 to be accumulated (stored) in the battery 173. The process then proceeds to step S7.

In step S7, the ECU 500 determines whether there is a request to turn on the heater from the user of the electrified vehicle 1*a*. When there is the request (Yes in S7), the process proceeds to step S8. When there is no such request (No in S7), the process proceeds to step S9. The ECU 500 may determine that there is the request, based on a signal that is sent to the ECU 500 when the user presses a button for turning on the heater.

In step S8, the ECU 500 determines whether the water pump 171 is on. When the water pump 171 is on (Yes in S8), the process proceeds to step S10. When the water pump 171 is not on (No in S8), the process proceeds to step S11.

In step S9, the ECU 500 turns off the heater. Turning off the heater means turning off the water pump 111, the electric heater 112, etc. When the heater is already off, the ECU 500 keeps the heater off. The process then proceeds to step S12.

In step S10, the ECU 500 turns on the compressor 151. Therefore, in this case, heat from the battery 173 is supplied via the chiller 160 to the heater core 114 serving as the air conditioning circuit. When the compressor 151 is already on, the ECU 500 keeps the compressor 151 on. The process then proceeds to step S12.

In step S11, the ECU 500 stops the compressor 151. Therefore, in this case, only the heat in the high temperature circuit 110 is used for the heater of the electrified vehicle 1*a*. When the compressor 151 is already off, the ECU 500 keeps the compressor 151 off. The process then proceeds to step S12.

In step S12, the ECU 500 determines whether the temperature of the battery 173 detected by the battery temperature sensor 175 is equal to or higher than 10° C. When the temperature of the battery 173 is equal to or higher than 10° C. (Yes in S12), the process proceeds to step S13. When the temperature of the battery 173 is lower than 10° C. (No in S12), the process returns to step S4. The threshold in step S12 may be a value other than 10° C. as long as it is equal to or higher than the threshold in step S2.

In step S13, the ECU 500 controls the five-way valve 180 and the five-way valve 190 to change the communication pattern of the thermal management circuit 100 from the battery heating communication pattern shown in FIG. 4 to a different communication pattern (e.g., a communication pattern suitable for traveling of the electrified vehicle 1*a*). The process then ends.

As described above, in the first embodiment, the ECU 500 causes the second closed circuit 20 connecting the flow path 170*a* and the flow path 170*b* formed and disconnects the second closed circuit 20, the flow path 130*a*, and the flow path 130*b* from each other to make them independent of each other during heating control of the battery 173. The heat generated by self-heating of the battery 173 can therefore be stored in the second closed circuit 20. The heat generated in the PCU 133 can be stored in the flow path 130*b*. As a result, it is possible to efficiently perform self-heating of the battery 173 while allowing effective use of heat generated by the PCU 133.

Heat generated by the motor and the PCU 133 can be stored in the flow path 130*b* disconnected from the battery 173. As described above, when the temperature of the heat medium in the flow path 130*b* is lower than the temperature of the battery 173, the heat medium in the flow path 130*b* is not allowed to flow into the battery 173. Therefore, heating of the battery 173 is less likely to be inhibited. When the temperature of the heat medium in the flow path 130*b* becomes equal to or higher than the temperature of the battery 173, the operation mode is switched to the mode in which the heat medium in the flow path 130*b* flows into the battery 173. Therefore, the temperature of the battery 173 can further be increased.

Second Embodiment

The configuration using the five-way valves 180, 190 is described in the first embodiment. However, the configuration of the switching unit according to the present disclosure is not limited to this. The configuration in which the "switching device" according to the present disclosure is an eight-way valve 280 will be described in a second embodiment.

Overall Configuration

Figure 6:
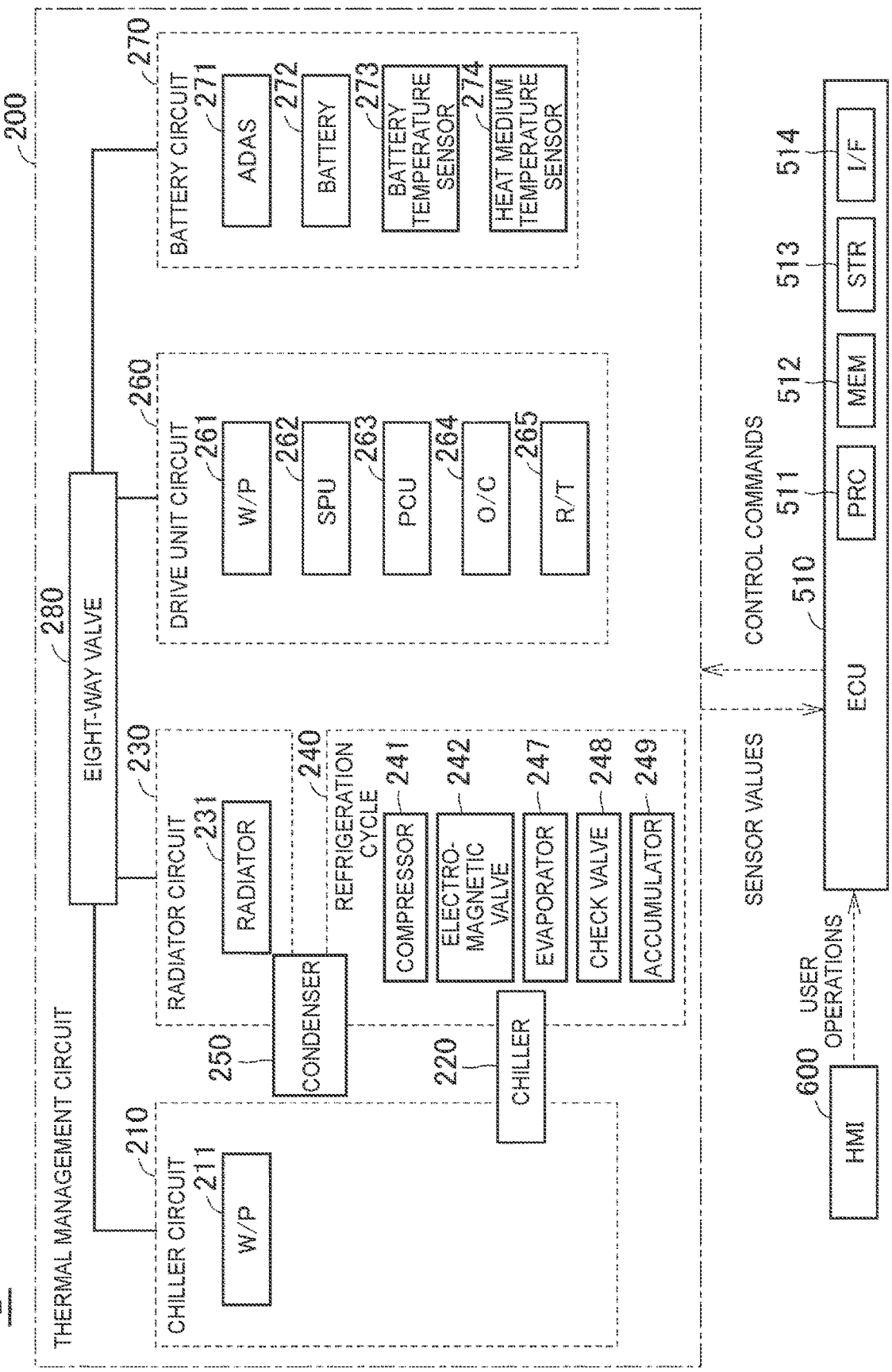
FIG. 6 shows the configuration of a thermal management system according to a second embodiment.

FIG. 6 shows an example of the overall configuration of a thermal management system 2 according to the second embodiment of the present disclosure. The thermal management system 2 is different from the thermal management system 1 (see FIG. 1) according to the first embodiment in that the thermal management system 2 includes a thermal management circuit 200 instead of the thermal management circuit 100 and includes an ECU 510 instead of the ECU 500.

The thermal management circuit 200 includes, for example, a chiller circuit 210, a chiller 220, a radiator circuit 230, a refrigeration cycle 240, a condenser 250, a drive unit circuit 260, a battery circuit 270, and an eight-way valve 280. The eight-way valve 280 is an example of the "switching device" of the present disclosure. The chiller 220 and the refrigeration cycle 240 are examples of the "chiller device" and the "air conditioning circuit" of the present disclosure, respectively.

The chiller circuit 210 includes a water pump (W/P) 211. The chiller 220 is connected to (shared by) both the chiller circuit 210 and the refrigeration cycle 240. The water pump 211 is an example of the "pump" of the present disclosure.

The radiator circuit 230 includes a radiator 231 and a bypass path 230b. The refrigeration cycle 240 includes, for example, a compressor 241, an electromagnetic valve 242, electromagnetic valves 244A, 244B, 245, and 246 (see FIG. 7), an evaporator 247, a check valve 248, and an accumulator 249. The condenser 250 includes a water-cooled condenser 251 and an air-cooled condenser 252 (see FIG. 7), and the water-cooled condenser 251 is connected to both the refrigeration cycle 240 and the radiator circuit 230.

The drive unit circuit 260 includes, for example, a water pump 261, an SPU 262, a PCU 263, an oil cooler 264, and a reservoir tank 265. Instead of the oil cooler 264, a transaxle may be provided in the drive unit circuit 260. The PCU 263 and the oil cooler 264 are examples of the "drive device" of the present disclosure. A system including the PCU 263, the oil cooler 264, and the battery 272 is an example of the "traction system" of the present disclosure.

The battery circuit 270 includes, for example, advanced driver-assistance systems (ADAS) 271, a battery 272, a battery temperature sensor 273, and a heat medium temperature sensor 274. The battery 272 is an example of the "electrical storage device" of the present disclosure. The battery temperature sensor 273 and the heat medium temperature sensor 274 are examples of the "first temperature sensor" and the "second temperature sensor" of the present disclosure, respectively.

The eight-way valve 280 includes eight ports P21 to P28 (see FIG. 7), and is connected to the chiller circuit 210, the radiator circuit 230, the drive unit circuit 260, and the battery circuit 270.

The ECU 510 controls the thermal management circuit 200. The ECU 510 includes a processor 511, a memory 512, a storage 513, and an interface 514.

Configuration of Thermal Management Circuit

Figure 7:
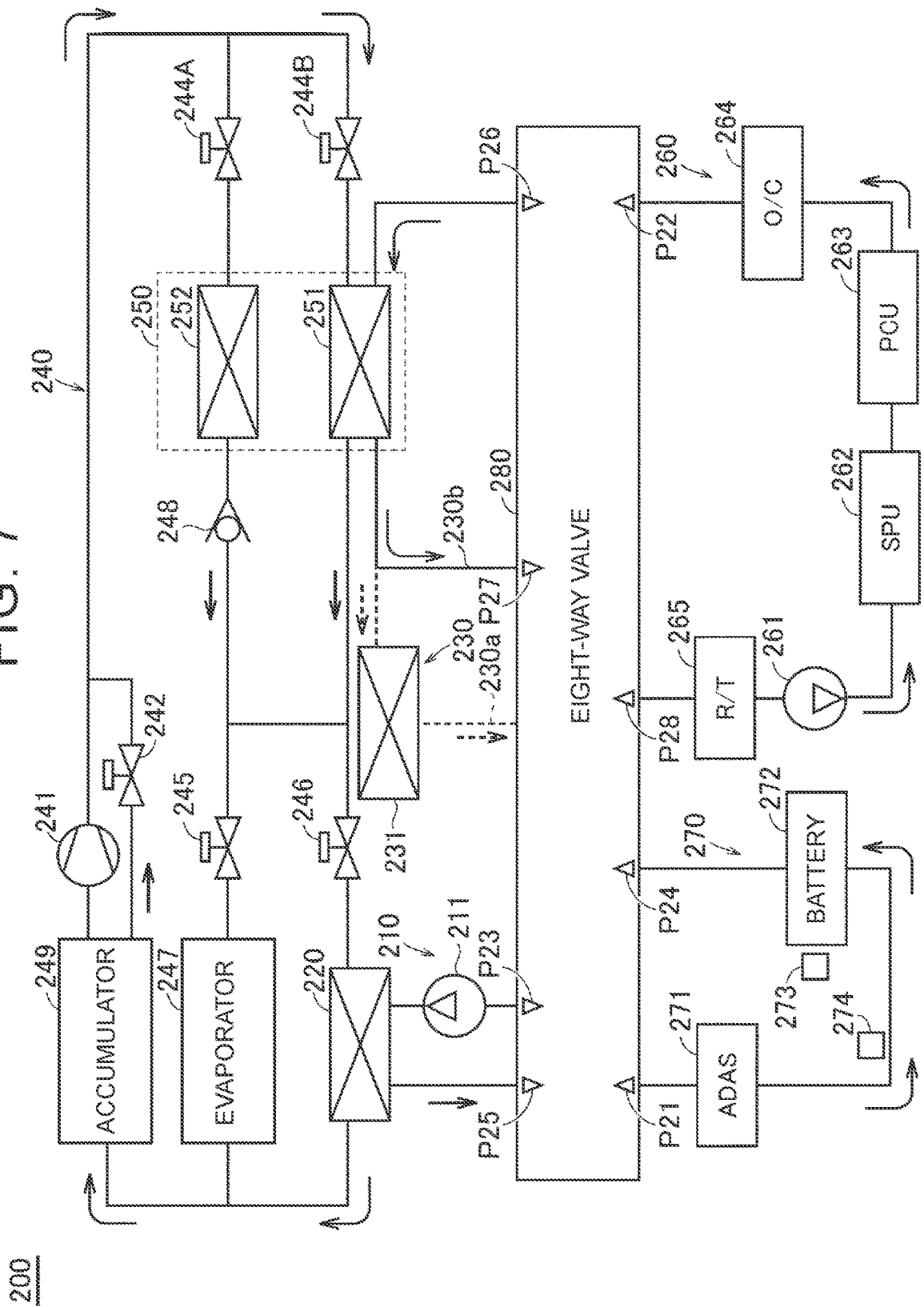
FIG. 7 shows the detailed configuration of the thermal management system according to the second embodiment.

FIG. 7 shows an example of the configuration of the thermal management circuit 200 according to the second embodiment. A heat medium circulating in the chiller circuit 210 flows through a path of "eight-way valve 280 (port P23)-water pump 211-chiller 220-eight-way valve 280 (port P25)."

The water pump 211 circulates the heat medium in the chiller circuit 210 according to a control command from the ECU 510. The chiller 220 exchanges heat between the heat medium circulating in the chiller circuit 210 and a refrigerant circulating in the refrigeration cycle 240. The eight-way valve 280 switches the path to which the chiller circuit 210 is connected according to a control command from the ECU 510. The switching of the path by the eight-way valve 280 will be discussed in detail later.

In the example shown in FIG. 7, the heat medium circulating in the radiator circuit 230 flows through a path of "eight-way valve (port P26)-water-cooled condenser 251-bypass path 230b-eight-way valve 280 (port P27)." The radiator 231 is disposed downstream of a grille shutter (not shown), and exchanges heat between air outside the vehicle and the heat medium.

The heat medium (gas-phase refrigerant or liquid-phase refrigerant) circulating in the refrigeration cycle 240 flows through one of first to fourth paths. The first path is a path of "compressor 241-electromagnetic valve 244A-air-cooled condenser 252-check valve 248-electromagnetic valve (expansion valve) 245-evaporator 247-accumulator 249-compressor 241." The second path is a path of "compressor 241-electromagnetic valve 244A-air-cooled condenser 252-check valve 248-electromagnetic valve (expansion valve) 246-chiller 220-accumulator 249-compressor 241." The third path is a path of "compressor 241-electromagnetic valve 244B-water-cooled condenser 251-electromagnetic valve (expansion valve) 245-evaporator 247-accumulator 249-compressor 241." The fourth path is a path of "compressor 241-electromagnetic valve 244B-water-cooled condenser 251-electromagnetic valve 246-chiller 220-accumulator 249-compressor 241."

The compressor 241 compresses the gas-phase refrigerant circulating in the refrigeration cycle 240 according to a control command from the ECU 510. The electromagnetic valve 242 is connected in parallel with the compressor 241, and adjusts the amount of gas-phase refrigerant flowing into the compressor 241 according to a control command from the ECU 510. The electromagnetic valves 244A, 244B selectively allow the gas-phase refrigerant discharged from the compressor 241 to flow into either the water-cooled condenser 251 or the air-cooled condenser 252 according to a control command from the ECU 510. The water-cooled condenser 251 exchanges heat between the gas-phase refrigerant discharged from the compressor 241 and the heat medium flowing in the radiator circuit 230. The air-cooled condenser 252 exchanges heat with air introduced into a vehicle cabin to produce warm air. The electromagnetic valve 245 restricts the flow of the liquid-phase refrigerant into the evaporator 247 according to a control command from the ECU 510. The electromagnetic valve 246 restricts the flow of the liquid-phase refrigerant into the chiller 220 according to a control command from the ECU 510. The electromagnetic valves 245, 246 also have a function to expand the liquid-phase refrigerant. The accumulator 249 removes the liquid-phase refrigerant from the refrigerant in a gas-liquid mixed state. The accumulator 249 thus prevents the liquid-phase refrigerant from being sucked into the compressor 241 when the refrigerant is not completely evaporated by the evaporator 247.

The heat medium (coolant) circulating in the drive unit circuit 260 flows through a path of "eight-way valve 280 (port P28)-reservoir tank 265-water pump 261-SPU 262-PCU 263-oil cooler 264-eight-way valve 280 (port P22)."

The water pump 261 circulates the heat medium in the drive unit circuit 260 according to a control command from the ECU 510. The SPU 262 controls charge and discharge of the battery 272 according to a control command from the ECU 510. The PCU 263 converts DC power supplied from the battery 272 to AC power to supply the AC power to a motor (not shown) contained in the transaxle according to a control command from the ECU 510. The oil cooler 264 cools the transaxle through heat exchange between the heat medium circulating in the drive unit circuit 260 and lubricating oil for the motor. Heat exchange may be performed between heat generated by supplying power to a stator without rotating a rotor of the motor and the heat medium circulating in the drive unit circuit 260. The SPU 262, the PCU 263, and the oil cooler 264 are cooled by the heat medium circulating in the drive unit circuit 260. The reservoir tank 265 stores part of the heat medium circulating in the drive unit circuit 260 (heat medium that has overflowed due to a pressure increase) to maintain the pressure and amount of heat medium in the drive unit circuit 260.

The heat medium (coolant) circulating in the battery circuit 270 flows through a path of "eight-way valve 280 (port P21)-ADAS 271-battery 272-eight-way valve 280 (port P24)."

The ADAS 271 includes, for example, adaptive cruise control (ACC), auto speed limiter (ASL), lane keeping assist (LKA), pre-crash safety (PCS), and lane departure alert (LDA). The battery circuit 270 may include an autonomous driving system (ADS) in addition to the ADAS 271. The battery 272 supplies traction power to the motor contained in the transaxle. The battery temperature sensor 273 detects the temperature of the battery 272. The heat medium temperature sensor 274 detects the temperature of the heat medium flowing in the battery circuit 270 (flow path 270a that will be described later).

Figure 8A:
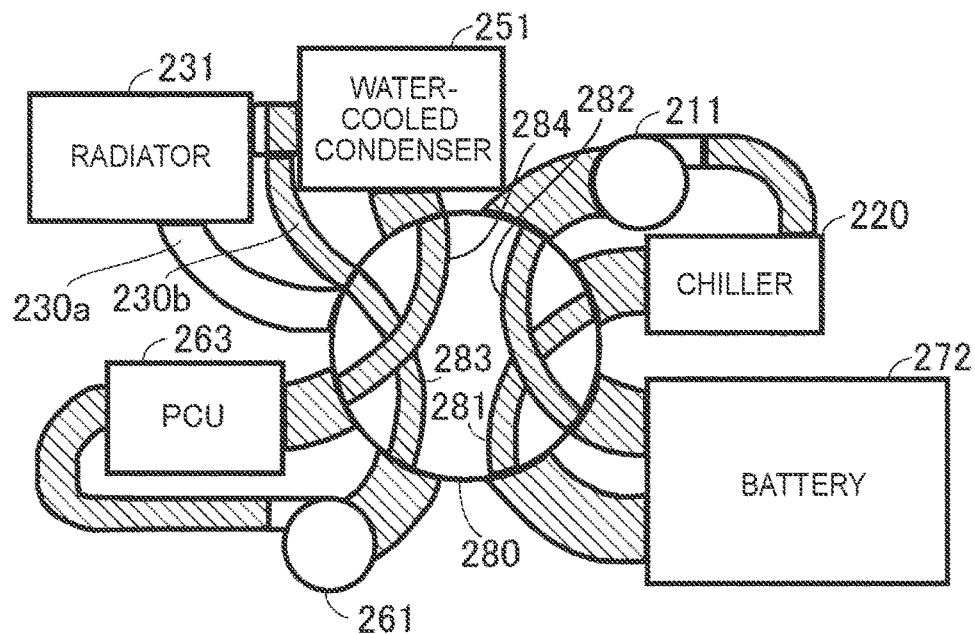
FIG. 8A shows the state of a thermal management circuit when heating a battery according to the second embodiment.
Figure 8B:
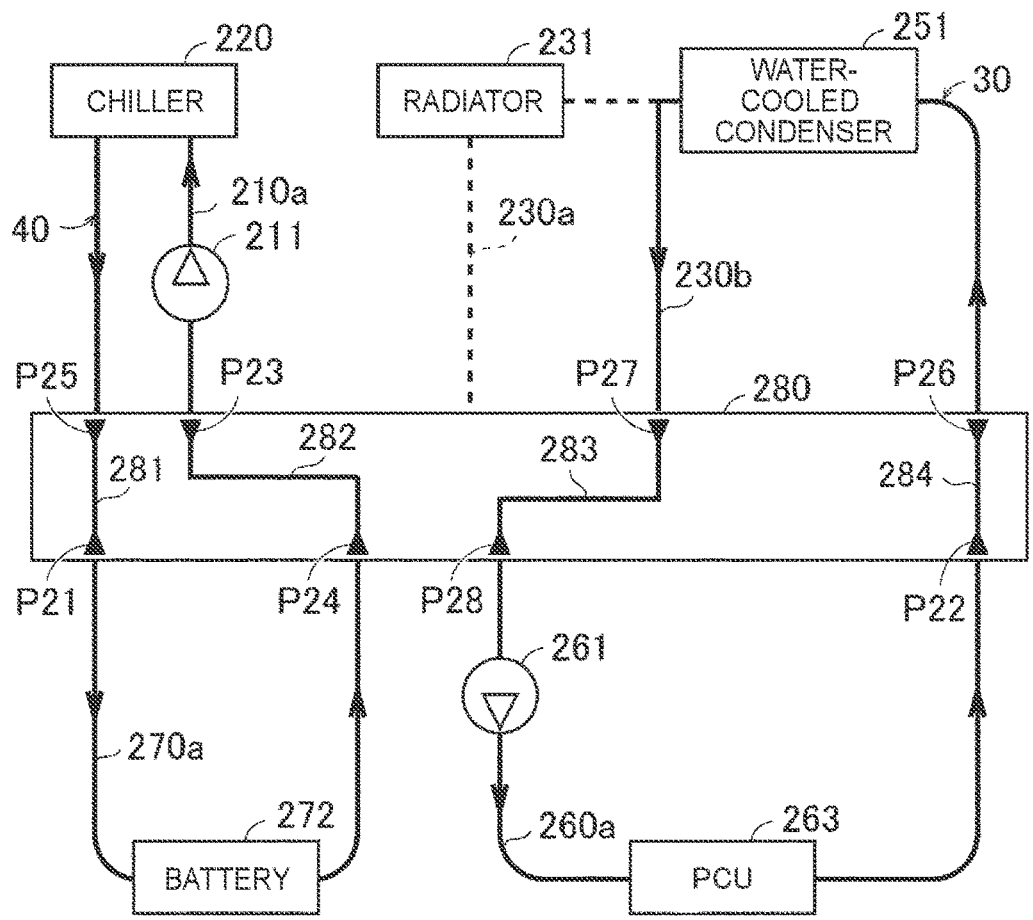
FIG. 8B shows a schematic configuration of the thermal management circuit corresponding to FIG. 8A.

As shown in FIGS. 8A and 8B, the chiller 220 is provided in a flow path 210a (see FIG. 8B) of the chiller circuit 210. The flow path 210a is a flow path connecting the ports P23, P25 of the eight-way valve 280. The flow path 210a is an example of the "fourth flow path" of the present disclosure.

The radiator 231 is provided in a flow path 230a (see FIG. 8B) of the radiator circuit 230. The flow path 230a connects the radiator 231 and the eight-way valve 280. The flow path 230a is in parallel with the bypass path 230b. The bypass path 230b connects a portion between the water-cooled condenser 251 and the radiator 231 and the eight-way valve 280. When the heat medium flows through the bypass path 230b, the heat medium does not flow through the radiator 231 (flow path 230a). When the heat medium flows through the radiator 231 (flow path 230a), the heat medium does not flow through the bypass path 230b. The flow path 230a is an example of the "third flow path" of the present disclosure.

The water pump 261, the SPU 262, the PCU 263, the oil cooler 264, and the reservoir tank 265 (only the water pump 261 and the PCU 263 are representatively shown in FIGS. 8A and 8B) are provided in a flow path 260a (see FIG. 8B) of the drive unit circuit 260. The flow path 260a is a flow path connecting the ports P28, P22 of the eight-way valve 280. The flow path 260a is an example of the "second flow path" of the present disclosure.

The battery 272 is provided in the flow path 270a (see FIG. 8B) of the battery circuit 270. The flow path 270a is a flow path connecting the ports P21, P24 of the eight-way valve 280. The flow path 270a is an example of the "first flow path" of the present disclosure.

Communication Patterns

FIGS. 8A, 8B and FIGS. 9A, 9B are conceptual diagrams showing an overview of a first communication pattern and a second communication pattern of the eight-way valve 280, respectively. The first communication pattern is an example of the "heating circuit" of the present disclosure.

In the first communication pattern (see FIGS. 8A and 8B), an internal flow path 281 of the eight-way valve 280 forms a path communicating between the port P25 and the port P21. In the first communication pattern, an internal flow path 282 of the eight-way valve 280 forms a path communicating between the port P24 and the port P23. In the first communication pattern, an internal flow path 283 of the eight-way valve 280 forms a path communicating between the port P27 and the port P28. In the first communication pattern, an internal flow path 284 of the eight-way valve 280 forms a path communicating between the port P22 and the port P26. In the first communication pattern, the bypass path 230b and the port P27 of the eight-way valve 280 are connected.

The bypass path 230b and the flow path 260a in which the PCU 263 etc. are provided are thus connected via the eight-way valve 280. As a result, a first closed circuit 30 (see FIG. 8B) is formed. The flow path 210a in which the chiller 220 is provided and the flow path 270a in which the battery 272 etc. are provided are connected via the eight-way valve 280. As a result, a second closed circuit 40 (see FIG. 8B) is formed. The second closed circuit 40 is an example of the "connection flow path" of the present disclosure.

In the example shown in FIGS. 8A and 8B, the radiator 231 (flow path 230a), the first closed circuit 30, and the second closed circuit 40 are disconnected from and independent of each other.

As shown in FIG. 8A, the eight-way valve 280 has a circular shape as viewed perpendicularly to the plane of the paper. The eight-way valve 280 is configured to rotate clockwise or counterclockwise.

Figure 9A:
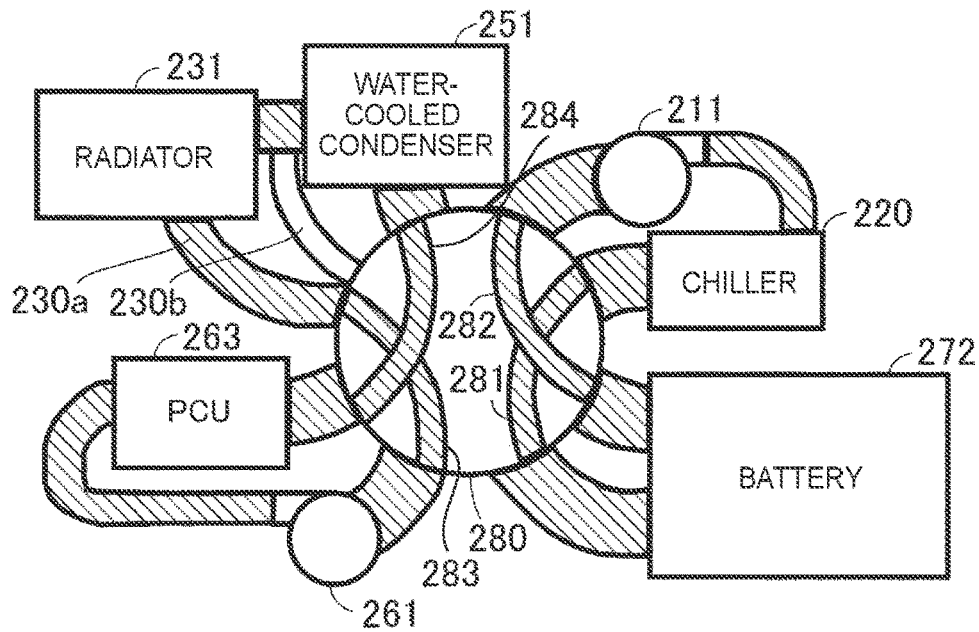
FIG. 9A shows the state of the thermal management circuit when an eight-way valve is rotated from the state of FIG. 8A.

FIG. 9A shows the second communication pattern with the eight-way valve 280 rotated counterclockwise by about 10 degrees from the state shown in FIG. 8A. In this case, the internal flow path 283 of the eight-way valve 280 is disconnected from the bypass path 230b and is connected to the flow path 230a. The connection states of the internal flow paths 281, 282, and 284 do not change from the states shown in FIG. 8A.

Figure 9B:
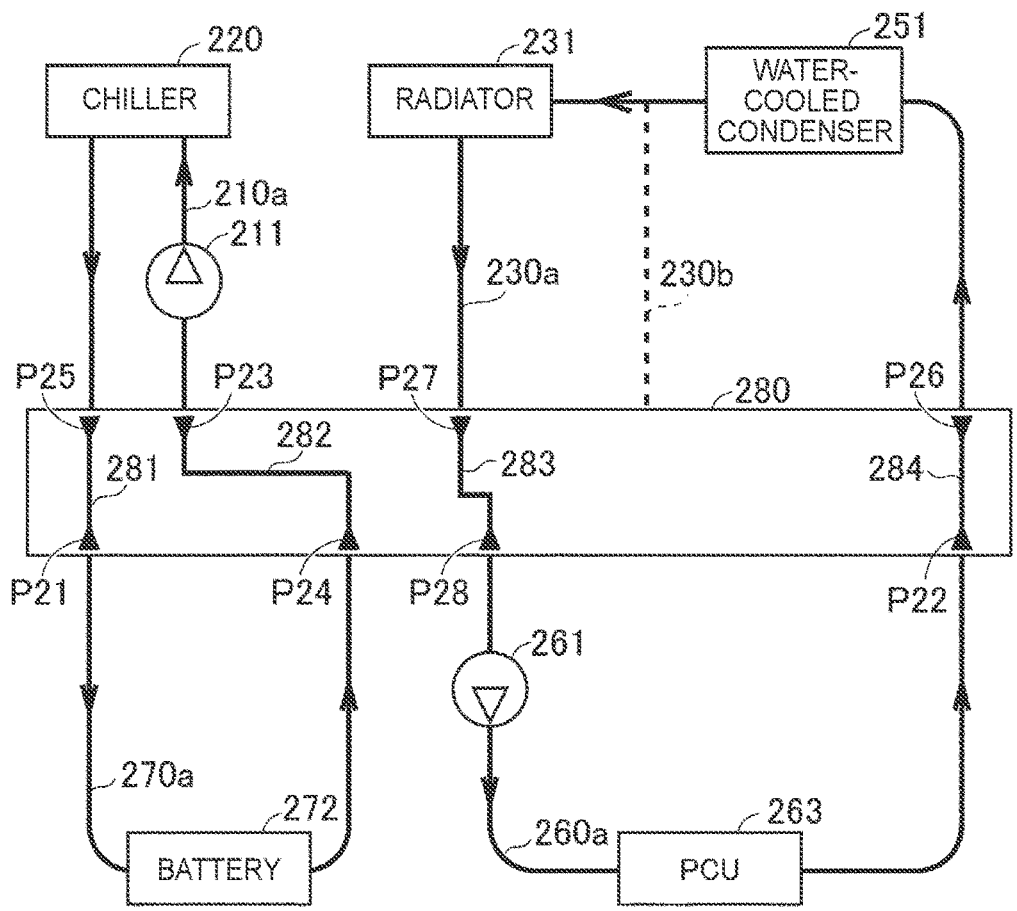
FIG. 9B shows a schematic configuration of the thermal management circuit corresponding to FIG. 9A.

As a result, as shown in FIG. 9B, the heat medium flows through a flow path of "radiator 231-eight-way valve 280-water pump 261-PCU 263-eight-way valve 280-water-cooled condenser 251."

Therefore, it is possible to easily switch between the first communication pattern (see FIGS. 8A and 8B) and the second communication pattern (see FIGS. 9A and 9B) by rotating the eight-way valve 280.

Method for Controlling Thermal Management Circuit

A method for controlling the thermal management system 2 will be described with reference to the flowchart of FIG. 10. The flow shown in FIG. 10 is merely illustrative, and the control in the present disclosure is not limited to the example shown in FIG. 10. Description of the same steps as those in the control flow of the first embodiment will be simplified or omitted.

In step S22 after S1, the ECU 510 determines whether the temperature of the battery 272 detected by the battery temperature sensor 273 is lower than 10° C. When the temperature of the battery 272 is lower than 10° C. (Yes in S22), the process proceeds to step S23. When the temperature of the battery 272 is equal to or higher than 10° C. (No in S22), the process ends. The threshold in step S22 may be a value other than 10° C.

In step S23, the ECU 510 controls the eight-way valve 280 so that the thermal management circuit 200 has the first communication pattern shown in FIGS. 8A and 8B. Specifically, the ECU 510 rotates the eight-way valve 280 to form the first communication pattern.

In step S24, the ECU 510 determines whether the temperature of the battery 272 detected by the battery temperature sensor 273 is higher than the temperature of the heat medium flowing in the battery circuit 270 detected by the heat medium temperature sensor 274. When the temperature of the battery 272 is higher than the temperature of the heat medium (Yes in S24), the process proceeds to step S25.

When the temperature of the battery 272 is equal to or lower than the temperature of the heat medium (No in S24), the process proceeds to step S26.

In step S25, the ECU 510 turns off the water pump 211. When the water pump 211 is already off, the ECU 510 keeps the water pump 211 off. The process then proceeds to step S27.

In step S26, the ECU 510 turns on the water pump 211. When the water pump 211 is already on, the ECU 510 keeps the water pump 211 on. The process then proceeds to step S27.

In step S27, the ECU 510 determines whether there is a request to turn on the heater from the user of the electrified vehicle 1a. When there is the request (Yes in S27), the process proceeds to step S28. When there is no such request (No in S27), the process proceeds to step S29.

In step S28, the ECU 510 determines whether the water pump 211 is on. When the water pump 211 is on (Yes in S28), the process proceeds to step S30. When the water pump 211 is not on (No in S28), the process proceeds to step S31.

In step S29, the ECU 510 turns off the heater. Turning off the heater means disabling the heating function in the refrigeration cycle 240. When the heater is already off, the ECU 510 keeps the heater off. The process then proceeds to step S33.

In step S30, the ECU 510 turns on the compressor 241. Therefore, in this case, heat from the battery 272 is supplied via the chiller 220 to the condenser 250 (air-cooled condenser 252) serving as the air conditioning circuit. When the compressor 241 is already on, the ECU 510 keeps the compressor 241 on. The process then proceeds to step S33.

In step S31, the ECU 510 turns on the water pump 211.
In step S32, the ECU 510 turns on the compressor 241.

In step S33, the ECU 510 determines whether the temperature of the battery 272 detected by the battery temperature sensor 273 is equal to or higher than 10° C. When the temperature of the battery 272 is equal to or higher than 10° C. (Yes in S33), the process proceeds to step S34. When the temperature of the battery 272 is lower than 10° C. (No in S33), the process returns to step S24. The threshold in step S33 may be a value other than 10° C. as long as it is equal to or higher than the threshold in step S22.

In step S34, the ECU 510 controls the eight-way valve 280 to change the communication pattern of the thermal management circuit 200 from the first communication pattern shown in FIGS. 8A and 8B to a different communication pattern (e.g., a communication pattern suitable for traveling of the electrified vehicle 1a) such as the second communication pattern (see FIGS. 9A and 9B). The process then ends.

Other configurations and effects of the second embodiment are the same as those of the first embodiment.

Third Embodiment

Unlike the second embodiment using the eight-way valve 280, a third embodiment uses two six-way valves. The same components as those of the second embodiment are denoted by the same signs, and description thereof will not be repeated.

Overall Configuration

Figure 11:
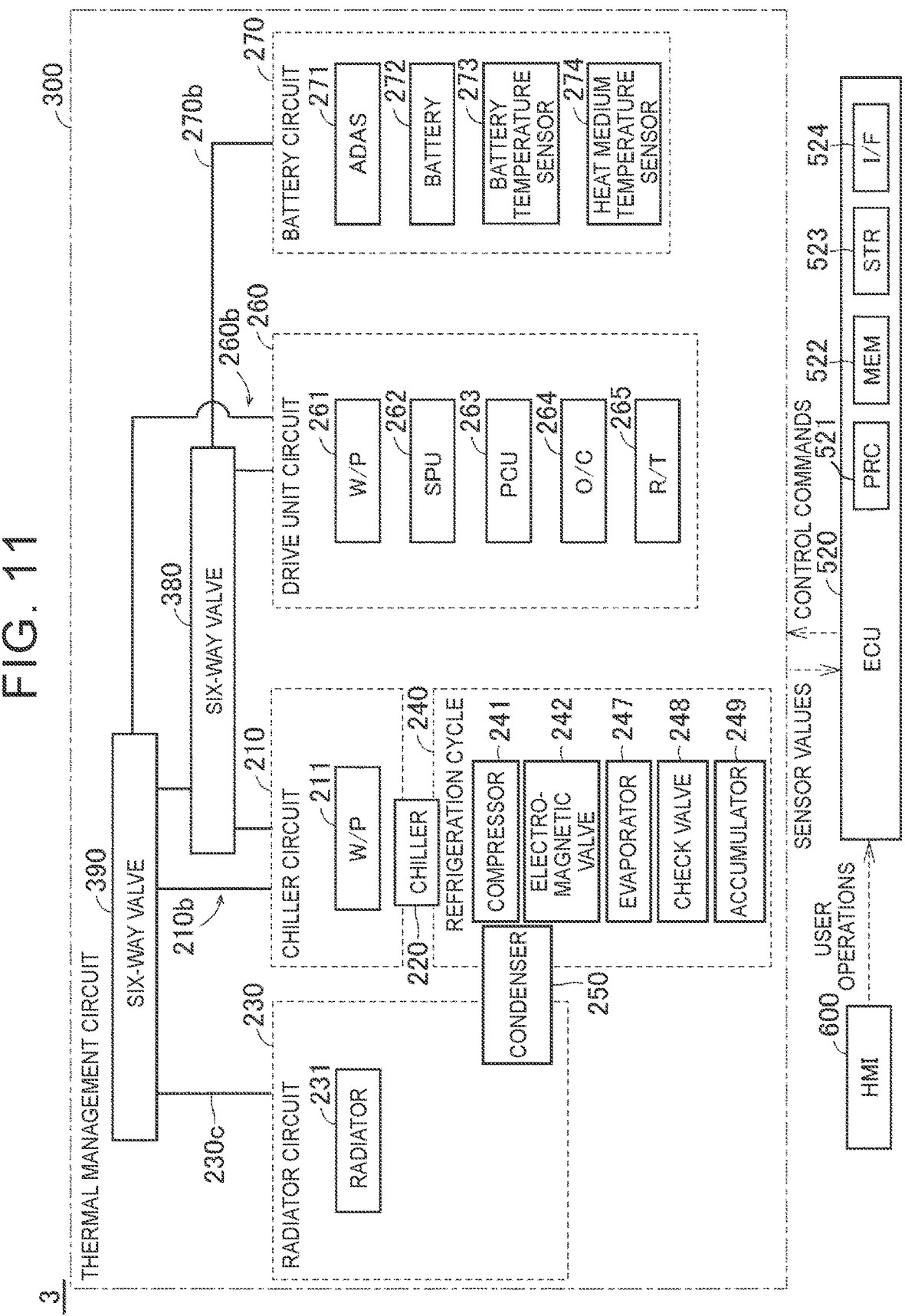
FIG. 11 shows the configuration of a thermal management system according to a third embodiment.

FIG. 11 shows an example of the overall configuration of a thermal management system 3 according to the third embodiment of the present disclosure. The thermal management system 3 is different from the thermal management system 2 (see FIG. 6) according to the second embodiment in that the thermal management system 3 includes a thermal management circuit 300 instead of the thermal management circuit 200 and includes an ECU 520 instead of the ECU 510.

The thermal management circuit 300 includes, for example, the chiller circuit 210, the chiller 220, the radiator circuit 230, the refrigeration cycle 240, the condenser 250, the drive unit circuit 260, the battery circuit 270, a six-way valve 380, and a six-way valve 390. Each of the six-way valve 380 and the six-way valve 390 is an example of the "switching device" of the present disclosure.

The chiller 220 is provided in a flow path 210b of the chiller circuit 210. The flow path 210b connects the chiller circuit 210 and each of the six-way valves 380, 390. The flow path 210b is an example of the "fourth flow path" of the present disclosure.

The radiator 231 is provided in a flow path 230c. The flow path 230c connects the radiator 231 and the six-way valve 390. The flow path 230c is an example of the "third flow path" of the present disclosure.

The water pump 261, the SPU 262, the PCU 263, the oil cooler 264, and the reservoir tank 265 are provided in a flow path 260b of the drive unit circuit 260. The flow path 260b connects the drive unit circuit 260 and each of the six-way valves 380, 390. The flow path 260b is an example of the "second flow path" of the present disclosure.

The battery 272 is provided in a flow path 270b of the battery circuit 270. The flow path 270b connects the battery circuit 270 and the six-way valve 380. The flow path 270b is an example of the "first flow path" of the present disclosure.

The ECU 520 controls the thermal management circuit 300. The ECU 520 includes a processor 521, a memory 522, a storage 523, and an interface 524.

Configuration of Thermal Management Circuit

Figure 12:
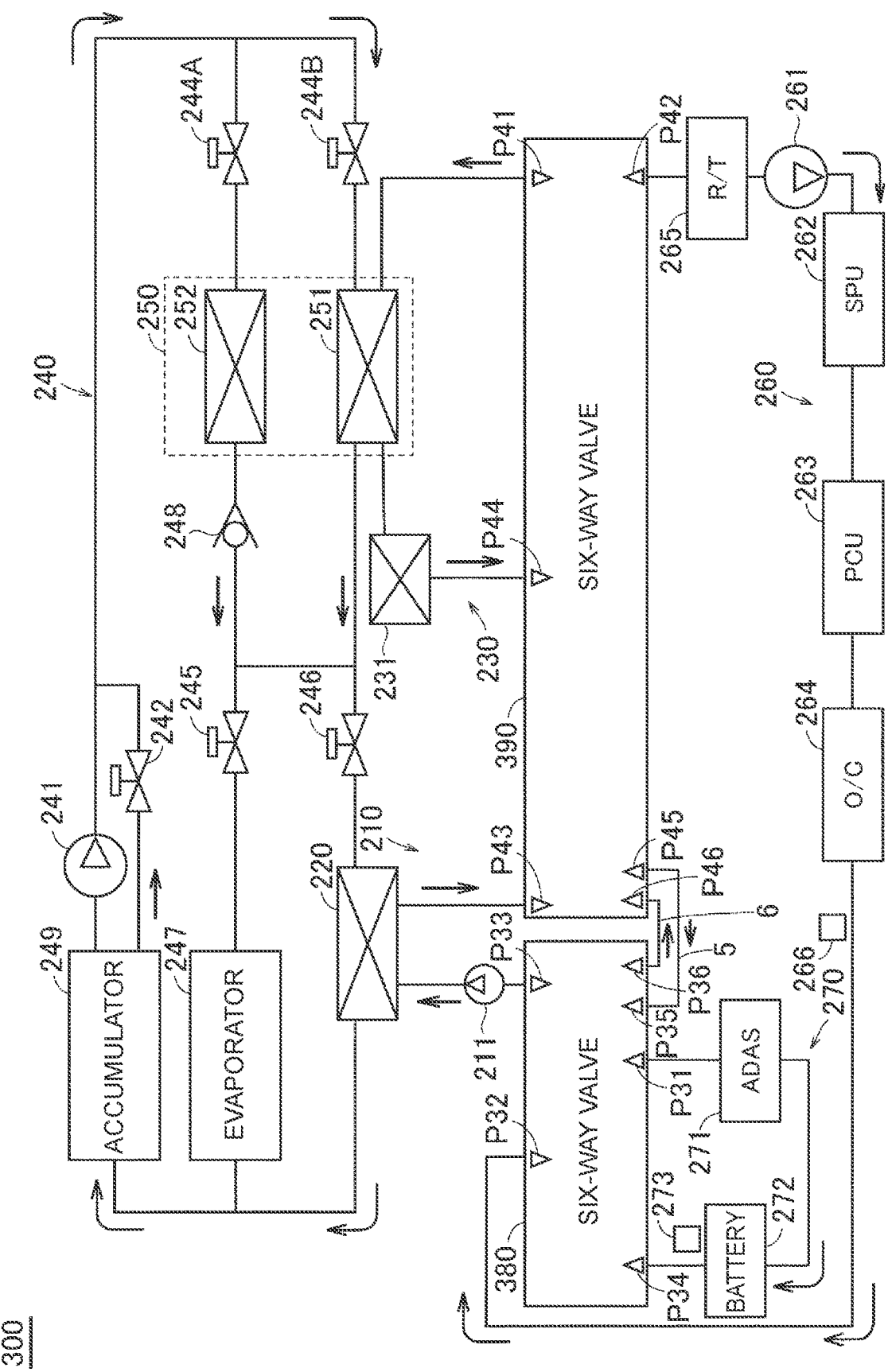
FIG. 12 shows the detailed configuration of the thermal management system according to the third embodiment.

FIG. 12 shows an example of the configuration of the thermal management circuit 300 according to the third embodiment. As shown in FIG. 12, the six-way valve 380 includes six ports P31 to P36. The six-way valve 390 includes six ports P41 to P46.

The six-way valve 380 is connected to the six-way valve 390. Specifically, the port P35 of the six-way valve 380 and the port P45 of the six-way valve 390 are connected by a flow path 5. The port P36 of the six-way valve 380 and the port P46 of the six-way valve 390 are connected by a flow path 6.

A heat medium circulating in the chiller circuit 210 flows through a path of "six-way valve 380 (port P33)-water pump 211-chiller 220-six-way valve 390 (port P43)."

The heat medium circulating in the radiator circuit 230 flows through a path of "six-way valve 390 (port P41)-water-cooled condenser 251-radiator 231-six-way valve 390 (port P44)."

The heat medium (coolant) circulating in the drive unit circuit 260 flows through a path of "six-way valve 390 (port P42)-reservoir tank 265-water pump 261-SPU 262-PCU 263-oil cooler 264-six-way valve 380 (port P32)."

The heat medium (coolant) circulating in the battery circuit 270 flows through a path of "six-way valve 380 (port P31)-ADAS 271-battery 272-six-way valve 380 (port P34)."

Communication Patterns

Figure 13:
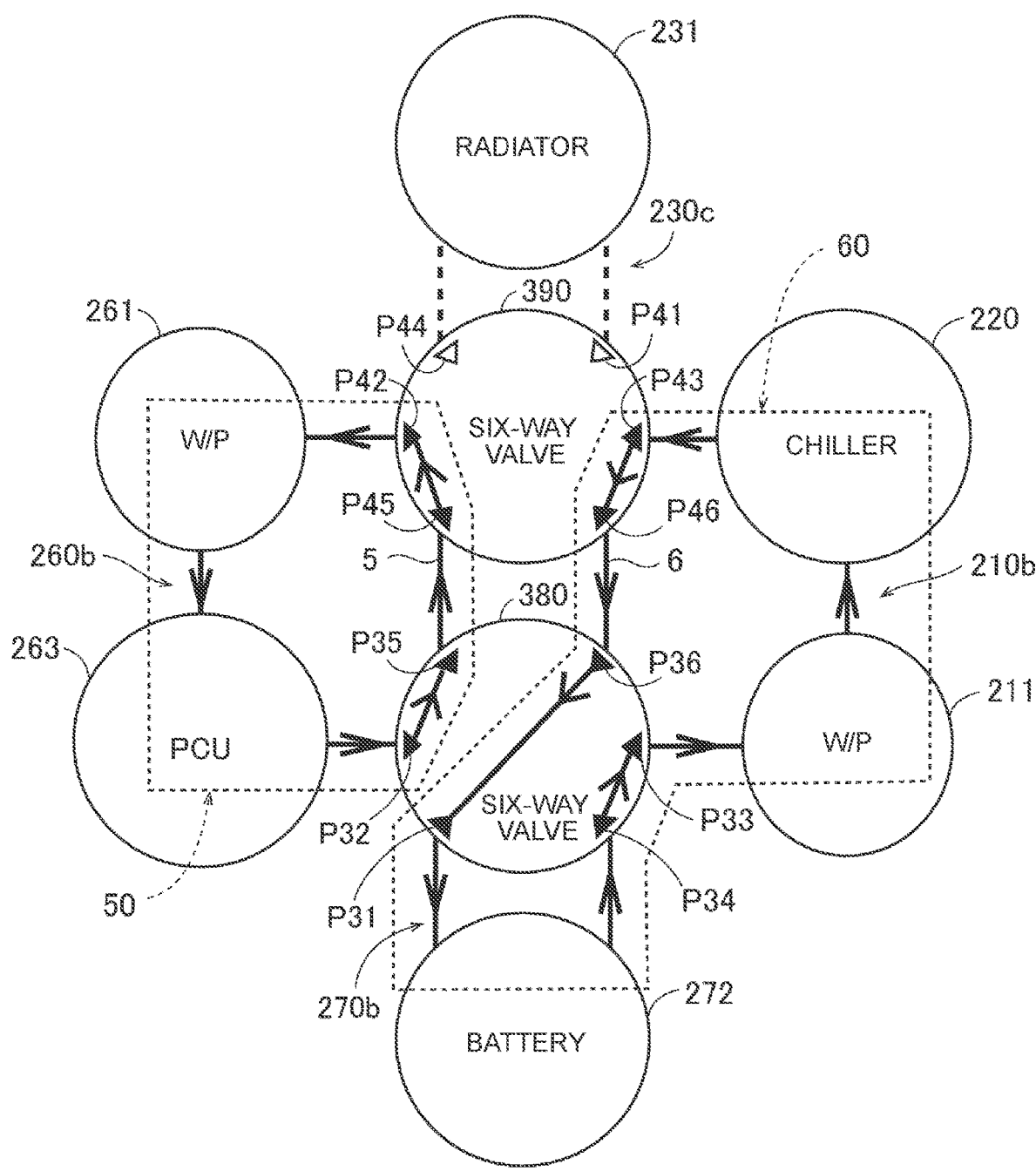
FIG. 13 shows the state of a thermal management circuit when heating a battery according to the third embodiment.

FIG. 13 is a conceptual diagram showing an overview of a battery heating communication pattern of the thermal management circuit 300 that is formed by controlling the six-way valve 380 and the six-way valve 390. In the communication pattern shown in FIG. 13, the six-way valve 380 forms a path communicating between the port P35 and the port P32, a path communicating between the port P36 and the port P31, and a path communicating between the port P33 and the port P34. The battery heating communication pattern is an example of the "heating circuit" of the present disclosure.

In the communication pattern shown in FIG. 13, the six-way valve 390 forms a path communicating between the port P42 and the port P45 and a path communicating between the port P43 and the port P46.

As a result, a first closed circuit 50 is formed by the flow path 260b in which the PCU 263 etc. are provided, the six-way valve 380, and the six-way valve 390. A second closed circuit 60 is formed by the flow path 210b in which the chiller 220 is provided, the flow path 270b in which the battery 272 etc. are provided, the six-way valve 380, and the six-way valve 390. The second closed circuit 60 is an example of the "connection flow path" of the present disclosure.

Method for Controlling Thermal Management Circuit

Figure 14:
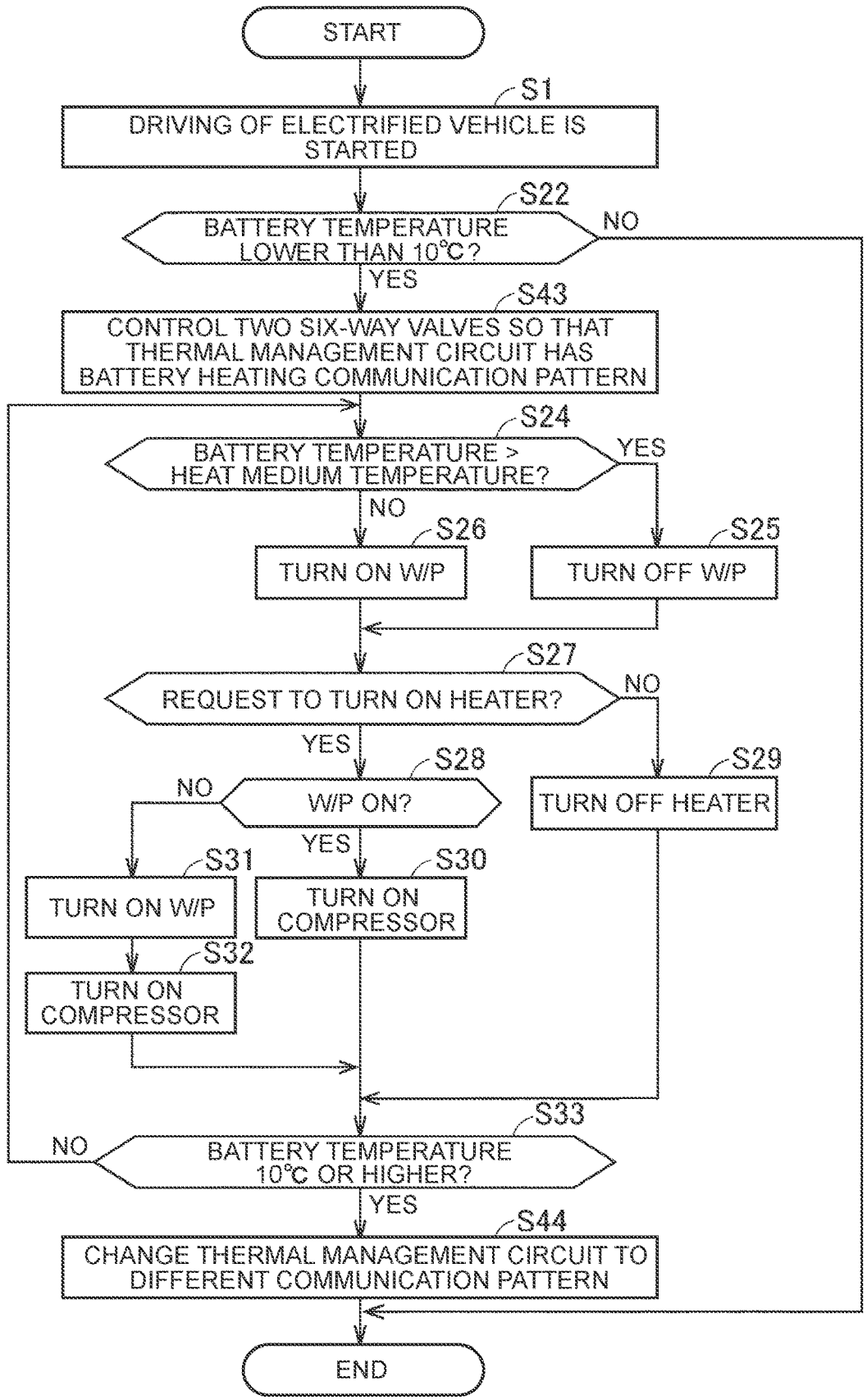
FIG. 14 is a flowchart showing a control that is performed by the thermal management system according to the third embodiment.

A method for controlling the thermal management system 3 will be described with reference to the flowchart of FIG. 14. Description of the same steps as those in the control flow of the second embodiment will not be repeated.

When Yes in step S22, the process proceeds to step S43. In step S43, the ECU 520 controls the six-way valve 380 and the six-way valve 390 so that the thermal management circuit 300 has the battery heating communication pattern shown in FIG. 13.

When Yes in step S33, the process proceeds to step S44. In step S44, the ECU 520 controls the six-way valve 380 and the six-way valve 390 to change the communication pattern of the thermal management circuit 300 from the battery heating communication pattern shown in FIG. 13 to a different communication pattern (e.g., a communication pattern suitable for traveling of the electrified vehicle 1a). The process then ends.

Other configurations and effects of the third embodiment are the same as those of the second embodiment.

The first to third embodiments illustrate an example in which battery heating control is performed at the start of driving the electrified vehicle 1a (when the traction system is activated). However, the present disclosure is not limited to this. The heating control may be started a predetermined time (e.g., 30 minutes) before the scheduled start time of the following trip.

Figure 15:
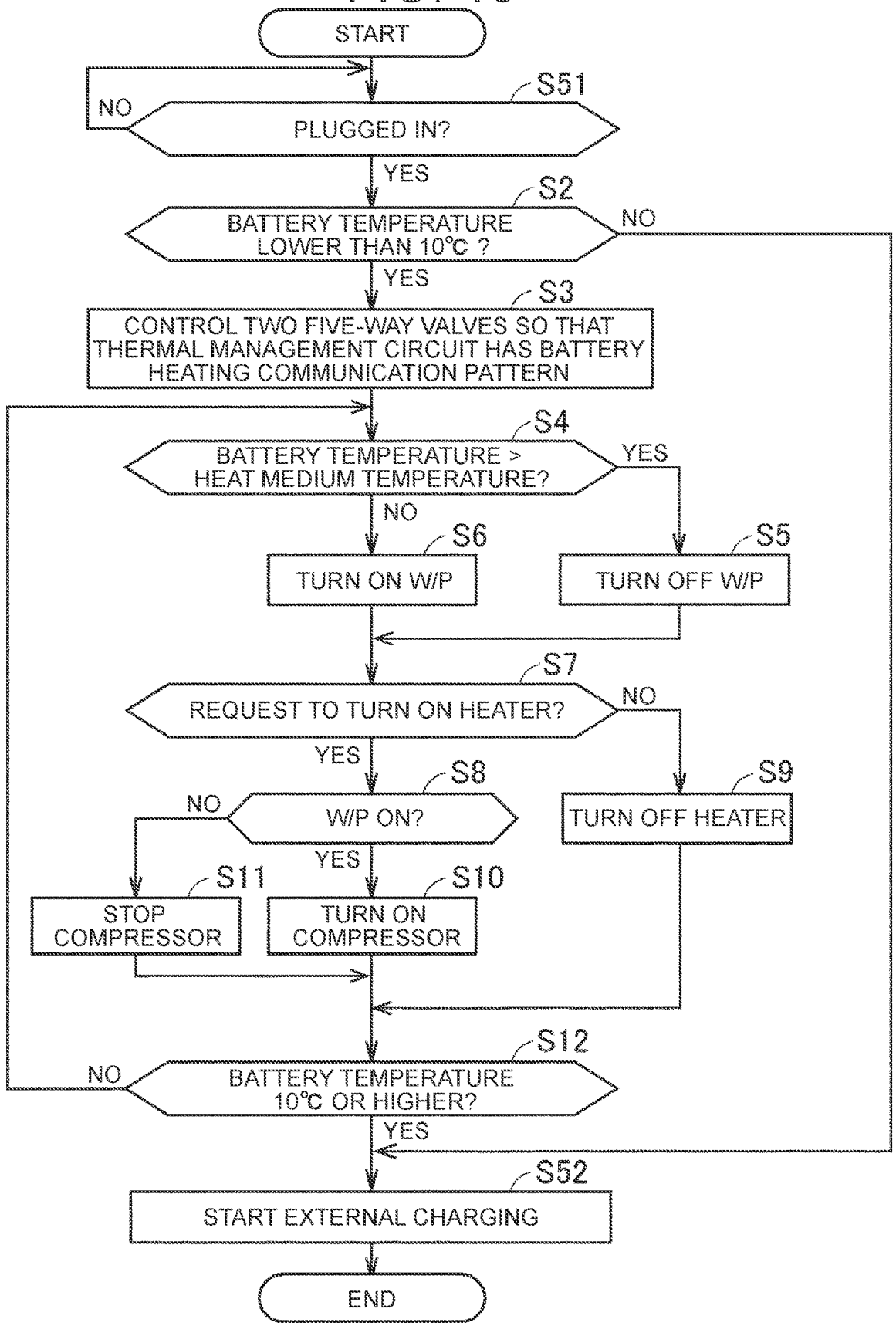
FIG. 15 is a flowchart showing a control that is performed by a thermal management system according to a modification of the first to third embodiments.

As shown in FIG. 15, the heating control may be performed at the start of external charging (e.g., fast charging). External charging refers to charging the battery with charging power supplied from charging equipment (not shown) external to the electrified vehicle. For example, when the ECU 500 detects a charging plug plugged in step S51, the process proceeds to step S2. When it is determined in step S12 or S2 that the temperature of the battery 173 is equal to or higher than 10° C., the process proceeds to step S52. Note that 10° C. is an example of the "predetermined temperature" of the present disclosure. In step S52, the ECU 500 starts controlling external charging (fast charging). FIG. 15 illustrates an example in which plugging in triggers the battery heating control. However, even before plugging in, the battery heating control may be started, for example, a predetermined time (e.g., 10 minutes) before the scheduled start time of external charging (scheduled start time of supplying charging power). FIG. 15 representatively illustrates an example in which the above control is applied to the first embodiment. However, the above control may be applied to the second and third embodiments.

The first to third embodiments illustrate an example in which the thermal management system is mounted on an electrified vehicle. However, the present disclosure is not limited to this. The thermal management system may be mounted on an electrical apparatus different from an electrified vehicle (e.g., a stationary electrical storage device).

The first to third embodiments illustrate an example in which the following two controls are performed: the control for switching the operating state of the chiller based on whether there is a heating request, and the control for switching the operating state of the water pump based on the comparison result between the temperature of the battery and the temperature of the heat medium. However, the present disclosure is not limited to this. Only one of the two controls may be performed. Alternatively, neither of the two controls may be performed.

Figure 16:
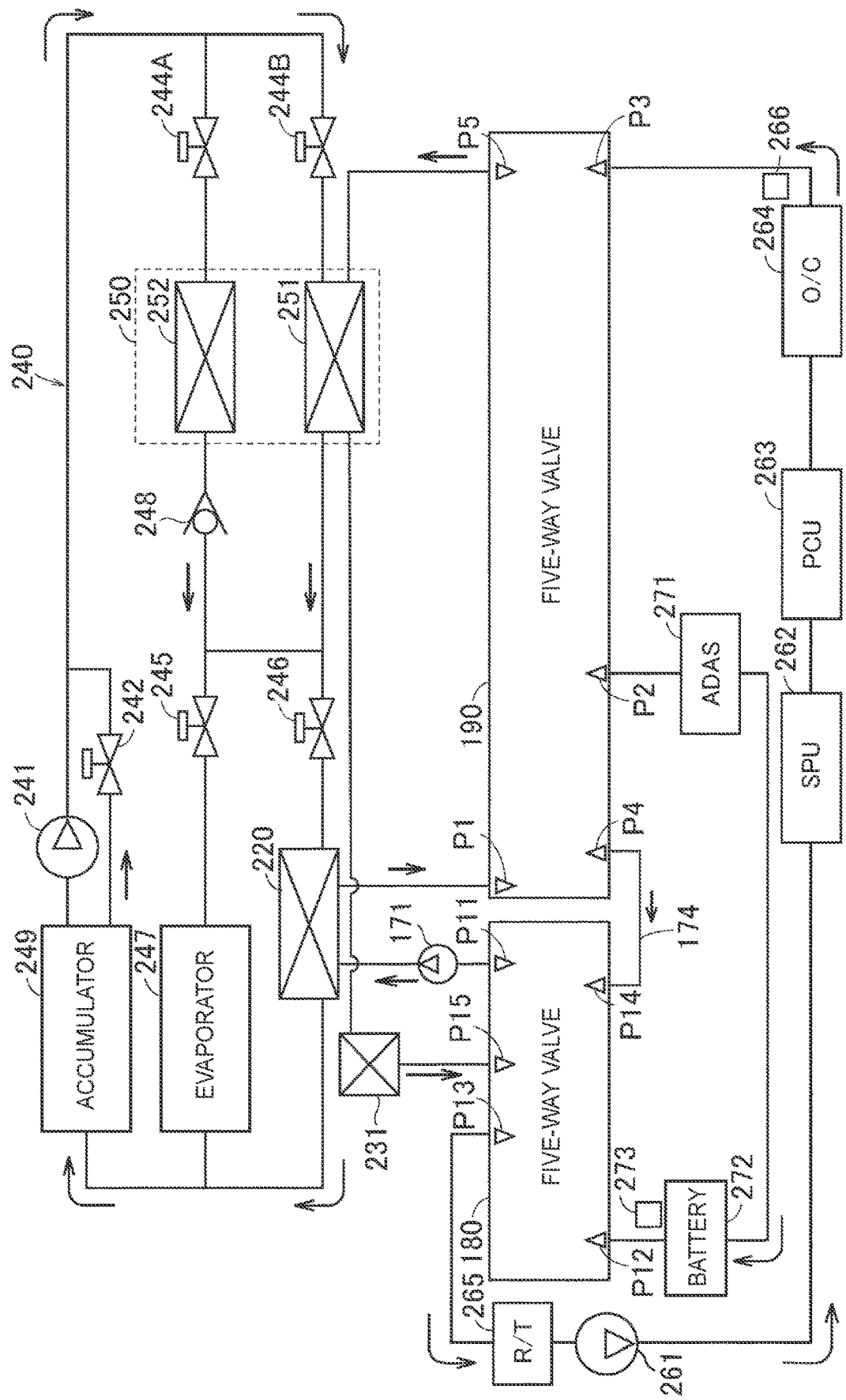
FIG. 16 shows the configuration of a thermal management system according to a modification of the first embodiment.
Figure 17:
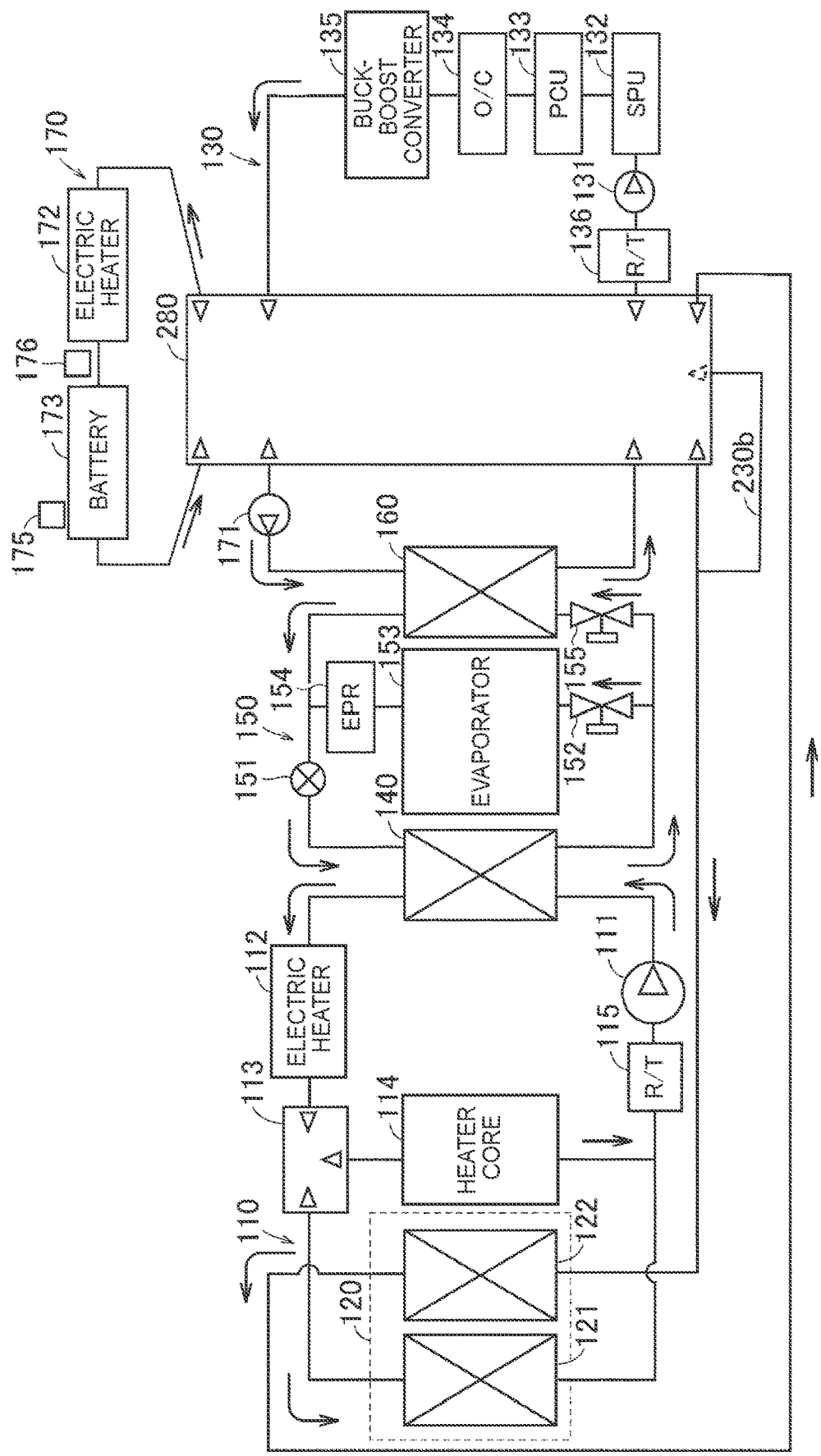
FIG. 17 shows the configuration of a thermal management system according to a modification of the second embodiment.
Figure 18:
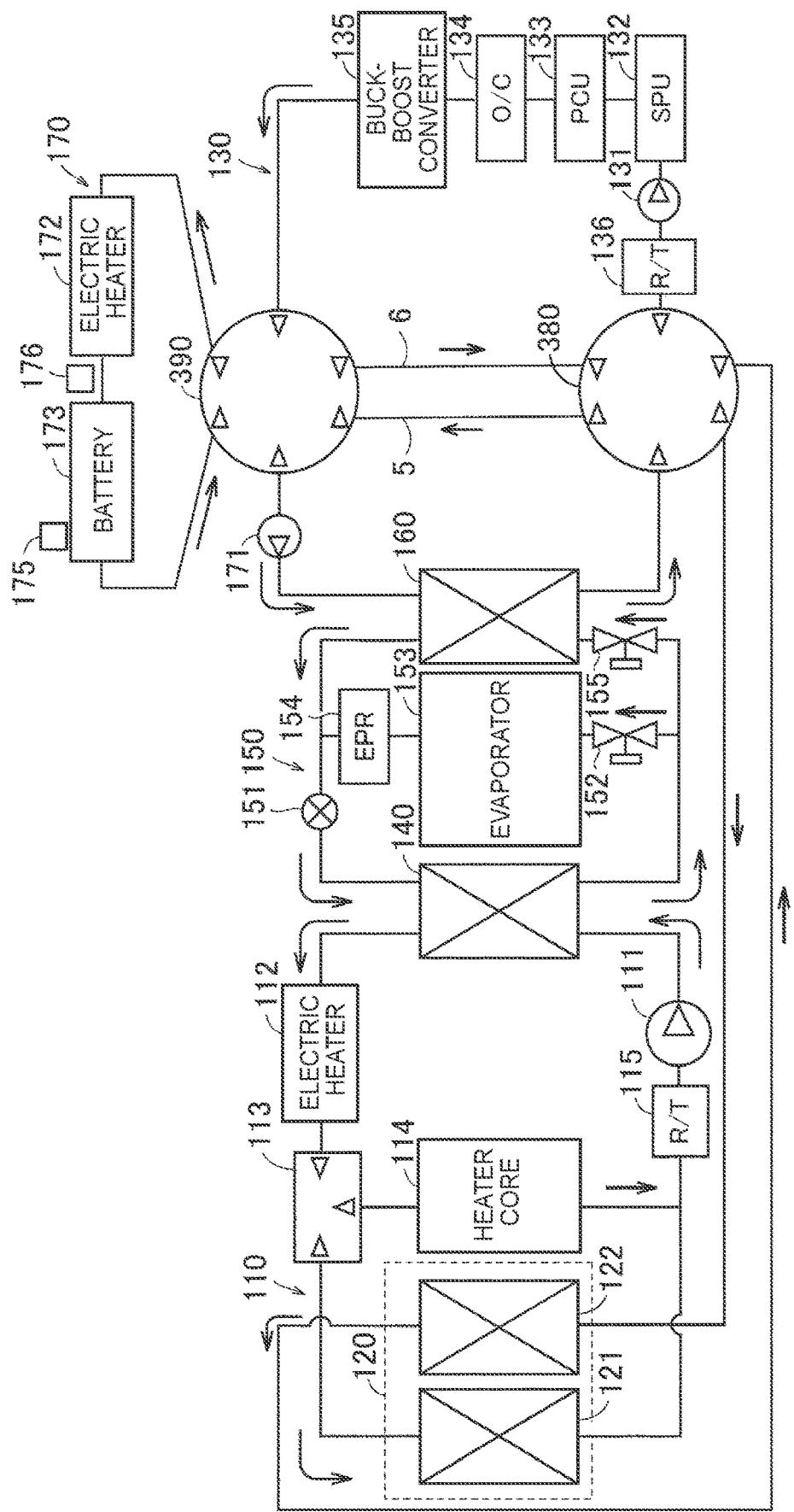
FIG. 18 shows the configuration of a thermal management system according to a modification of the third embodiment.

The first embodiment illustrates an example in which the thermal management circuit 100 includes the high temperature circuit 110. However, the present disclosure is not limited to this. The thermal management circuit 100 may not include the high temperature circuit 110 (see FIG. 16). The thermal management circuit 200 of the second embodiment and the thermal management circuit 300 of the third embodiment may include a high temperature circuit having the same function as the high temperature circuit 110 (see FIGS. 17 and 18).

The first to third embodiments illustrate an example in which battery heating control is performed at the start of driving the electrified vehicle 1a (when the traction system is activated). However, the present disclosure is not limited to this. The heating control may be performed other than at the start of driving the electrified vehicle 1a (when the traction system is activated). For example, the heating control may be performed when the battery temperature falls below a predetermined threshold (10° C. in the above embodiment). In this case, the ECU may acquire the detected value of the battery temperature at predetermined intervals (e.g., every hour). The battery may be heated by causing a current larger than normal to flow through the battery with the battery heating communication pattern formed during traveling of the electrified vehicle 1a.

The configurations (processes) of the above embodiments and modifications may be combined.

Figure 19:
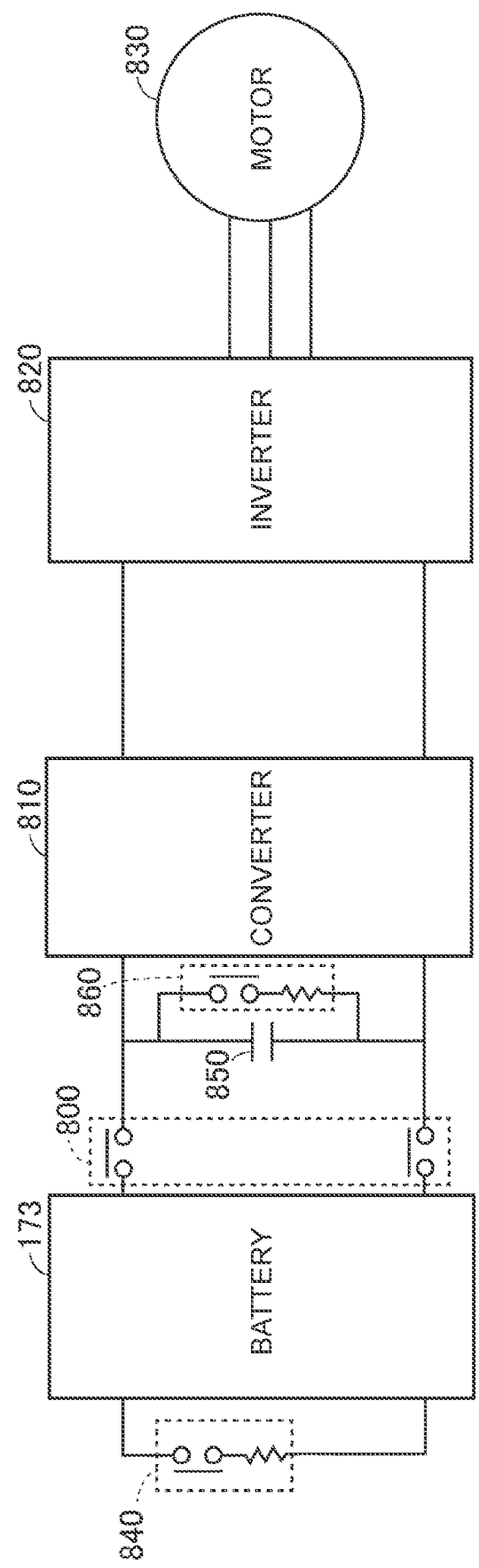
FIG. 19 shows a circuit configuration including a battery, a converter, an inverter, and a motor.

The battery heating control will be described in detail with reference to FIG. 19. The battery 173 is connected to a converter 810 via a system main relay (SMR) 800. The converter 810 is connected to an inverter 820. The inverter 820 is connected to a motor 830. A discharge circuit 840 including a switch and a resistive element is connected to the battery 173. A smoothing capacitor 850 is provided between the battery 173 and the converter 810. A discharge circuit 860 composed of a switch and a resistive element is connected in parallel with the smoothing capacitor 850. FIG. 19 is representatively illustrated based on the configuration of the first embodiment. However, the same configuration may be applied to the second and third embodiments.

The heating control for the battery 173 may include, for example, a control for electrically disconnecting the SMR 800 and turning on the switch of the discharge circuit 840. In this case, a current flows through the closed circuit formed by the battery 173 and the discharge circuit 840. The heating control for the battery 173 may include a control for turning off the switch of the discharge circuit 840 and turning on the SMR 800 and the switch of the discharge circuit 860. In this case, a current flows through the closed circuit formed by the battery 173, the SMR 800, and the discharge circuit 860. The heating control for the battery 173 may include a control for causing a current adjusted so that no torque is generated in the motor 830 to flow with the SMR 800 turned on and the switches of the discharge circuits 840, 860 turned off.

The embodiments disclosed herein should be construed as illustrative in all respects and not restrictive. The scope of the present disclosure is set forth in the claims rather than in the above description of the embodiments, and is intended to include all modifications within the meaning and scope equivalent to those of the claims.

What is claimed is:

1. A thermal management system mounted on an electrical apparatus, the thermal management system comprising:
   a first flow path, a second flow path, a third flow path, and a fourth flow path, each configured to allow a heat medium to flow through;
   an electrical storage device configured to exchange heat with the heat medium in the first flow path;
   a drive device configured to exchange heat with the heat medium in the second flow path and to supply a driving force to the electrical apparatus;
   a radiator provided on the third flow path;
   a chiller device provided on the fourth flow path;
   a switching device configured to switch a connection state among the first flow path, the second flow path, the third flow path, and the fourth flow path, wherein the switching device is configured to form a heating circuit when heating the electrical storage device by causing a current to flow through the electrical storage device, the heating circuit being a flow path circuit in which a connection flow path connecting the first flow path and the fourth flow path is formed; and the connection flow path, the second flow path, and the third flow path are disconnected from and independent of each other, and
   the first flow path, the second flow path, the third flow path, and the fourth flow path are independently controlled by the switching device.

2. The thermal management system according to claim 1, wherein:
   the electrical apparatus is an electrified vehicle; and
   the electrical storage device is heated when a traction system of the electrified vehicle is activated.

3. The thermal management system according to claim 1, wherein:
   the electrical storage device is configured to be externally chargeable with charging power supplied from charging equipment external to the electrical apparatus; and
   at start of being externally charged, the electrical storage device is heated to increase a temperature of the electrical storage device to a predetermined temperature or higher.

4. The thermal management system according to claim 1, further comprising:
   a first temperature sensor configured to measure a temperature of the electrical storage device;
   a second temperature sensor configured to measure a temperature of the heat medium in the first flow path; and
   a pump configured to circulate the heat medium in the connection flow path, wherein:
   the pump is stopped when a measured value from the first temperature sensor is higher than a measured value from the second temperature sensor during heating with the heating circuit formed; and
   the pump is driven when the measured value from the first temperature sensor is equal to or less than the measured value from the second temperature sensor during the heating with the heating circuit formed.

5. The thermal management system according to claim 1, wherein:
   the electrical apparatus is an electrified vehicle;
   the chiller device is configured to exchange heat with an air conditioning circuit configured to adjust a cabin temperature of the electrified vehicle; and
   when a heating request using the air conditioning circuit is made during the heating with the heating circuit formed, heat generated by the electrical storage device is supplied to the air conditioning circuit via the chiller device.

6. The thermal management system according to claim 1, further comprising a control device, wherein the control device is configured to, when heating the electrical storage device by causing the current to flow through the electrical storage device, control the switching device to cause the heating circuit formed.

7. The thermal management system according to claim 1, wherein the switching device includes a first five-way valve configured to connect or disconnect the first flow path, the second flow path, the third flow path, and the fourth flow path to or from each other; and a second five-way valve configured to connect or disconnect the first flow path, the second flow path, the third flow path, and the fourth flow path to or from each other.

8. The thermal management system according to claim 1, wherein the switching device includes an eight-way valve configured to connect or disconnect the first flow path, the second flow path, the third flow path, and the fourth flow path to or from each other.

9. The thermal management system according to claim 1, wherein the switching device includes a first six-way valve configured to connect or disconnect the first flow path, the second flow path, the third flow path, and the fourth flow path to or from each other; and a second six-way valve configured to connect or disconnect the first flow path, the second flow path, the third flow path, and the fourth flow path to or from each other.

* * * * *